United States Patent
Khajuria et al.

(10) Patent No.: US 9,245,108 B1
(45) Date of Patent: Jan. 26, 2016

(54) DYNAMIC ADJUSTMENT OF THE FILE FORMAT TO IDENTIFY UNTRUSTED FILES

(71) Applicant: Bromium, Inc., Cupertino, CA (US)

(72) Inventors: Deepak Khajuria, San Jose, CA (US); Mahesh Pisal, Fremont, CA (US); Krzysztof Uchronski, Cambridge (GB); Vikram Kapoor, Cupertino, CA (US); Ian Pratt, Cambridge (GB); Gaurav Banga, Cupertino, CA (US)

(73) Assignee: Bromium, Inc., Cupertino, CA (US)

( * ) Notice: Subject to any disclaimer, the term of this patent is extended or adjusted under 35 U.S.C. 154(b) by 9 days.

(21) Appl. No.: 14/326,175

(22) Filed: Jul. 8, 2014

Related U.S. Application Data

(63) Continuation-in-part of application No. 13/419,345, filed on Mar. 13, 2012, now Pat. No. 9,148,428.

(51) Int. Cl.
*H04L 29/06* (2006.01)
*G06F 21/00* (2013.01)
*G06F 21/50* (2013.01)

(52) U.S. Cl.
CPC ...................................... *G06F 21/50* (2013.01)

(58) Field of Classification Search
CPC ........................................................ G06F 21/50
See application file for complete search history.

(56) References Cited

U.S. PATENT DOCUMENTS

| | | | |
|---|---|---|---|
| 6,948,044 | B1 | 9/2005 | Chandrasekaran |
| 7,171,523 | B2 | 1/2007 | Yamasaki |
| 7,506,265 | B1 | 3/2009 | Traut et al. |
| 8,146,084 | B1 | 3/2012 | Meketa |
| 8,346,727 | B1 | 1/2013 | Chester et al. |
| 8,543,641 | B2 | 9/2013 | Cherukuri et al. |
| 2004/0128670 | A1 | 7/2004 | Robinson et al. |
| 2005/0149726 | A1 | 7/2005 | Joshi et al. |
| 2006/0101189 | A1 | 5/2006 | Chandrasekaran et al. |
| 2006/0136910 | A1 | 6/2006 | Brickell et al. |
| 2006/0143617 | A1 | 6/2006 | Knauerhase et al. |
| 2006/0184937 | A1 | 8/2006 | Abels et al. |
| 2006/0288343 | A1 | 12/2006 | Pallister |
| 2007/0150956 | A1 | 6/2007 | Sharma et al. |
| 2007/0180450 | A1 | 8/2007 | Croft et al. |
| 2007/0192329 | A1 | 8/2007 | Croft et al. |
| 2007/0250833 | A1 | 10/2007 | Araujo et al. |
| 2008/0001958 | A1 | 1/2008 | Vembu et al. |
| 2009/0007242 | A1 | 1/2009 | Subramanian et al. |

(Continued)

FOREIGN PATENT DOCUMENTS

WO    2008073618 A2    6/2008

*Primary Examiner* — Lisa Lewis
(74) *Attorney, Agent, or Firm* — Brokaw Patent Law PC; Christopher J. Brokaw

(57) ABSTRACT

Approaches for an operating system to ascertain whether files stored its file system have been deemed trustworthy. When an operating system receives a request to perform an operation involving a file that is stored within the file system maintained by the operating system, the operating system requests the file from a driver. In turn, the driver consults a set of trust data to identify whether the file has been previously deemed trustworthy. Upon the driver determining that the file has been deemed trustworthy, the driver provides the file to the operating system in a first format. On the other hand, upon the driver determining that the file has not been deemed trustworthy, the driver provides the file to the operating system in a second format that is different than the first format. Advantageously, the file is stored in a single format in the file system.

20 Claims, 8 Drawing Sheets

(56) References Cited

U.S. PATENT DOCUMENTS

| | | |
|---|---|---|
| 2009/0119541 A1 | 5/2009 | Inoue et al. |
| 2009/0165133 A1 | 6/2009 | Hwang et al. |
| 2009/0172820 A1 | 7/2009 | Watson |
| 2009/0249472 A1 | 10/2009 | Litvin et al. |
| 2009/0276783 A1 | 11/2009 | Johnson et al. |
| 2009/0313620 A1 | 12/2009 | Sedukhin et al. |
| 2009/0328033 A1 | 12/2009 | Kohavi et al. |
| 2010/0122343 A1 | 5/2010 | Ghosh et al. |
| 2010/0235831 A1 | 9/2010 | Dittmer |
| 2011/0035494 A1 | 2/2011 | Pandey et al. |
| 2011/0093953 A1 * | 4/2011 | Kishore et al. ........ G06F 21/568 726/24 |
| 2011/0173251 A1 | 7/2011 | Sandhu et al. |
| 2011/0296487 A1 | 12/2011 | Walsh |
| 2011/0302577 A1 | 12/2011 | Reuther et al. |
| 2012/0089666 A1 | 4/2012 | Goswami et al. |

\* cited by examiner

DYNAMIC ADJUSTMENT OF THE FILE FORMAT TO IDENTIFY UNTRUSTED FILES

RELATED APPLICATION DATA

This application is a continuation-in-part of, and claims priority to, U.S. non-provisional patent application Ser. No. 13/419,345, filed Mar. 13, 2012, entitled "Seamless Management of Untrusted Data Using Virtual Machines" the contents of which are hereby incorporated by reference for all purposes as if fully set forth herein.

This application is related to U.S. non-provisional patent application Ser. No. 13/115,354, filed May 25, 2011, which has a priority date of May 28, 2010, entitled "Approaches for Securing an Internet Endpoint using Fine-Grained Operating System Virtualization," the contents of which are hereby incorporated by reference for all purposes as if fully set forth herein.

FIELD OF THE INVENTION

Embodiments of the invention relate to the dynamic adjustment of the format of a file to allow the trustworthiness of the file to be ascertained by other parties.

BACKGROUND

Ensuring the security of Internet users and Internet connected devices is one of the grand challenges facing us today. The current state of affairs is very problematic, as our cyber-security infrastructure is easily and routinely subverted by cyber criminals, resulting in great economic loss. Every year brings deeper and more complex dependence by society on our cyber-infrastructure, and yet at the same time the cyber-security problem only worsens as the capabilities of the cyber-criminal mature. In effect, we are building mission-critical dependence into virtually every aspect of human activities on a cyber-infrastructure that is very insecure at its core.

The prevailing school of thought on how to protect cyber-infrastructures places great emphasis on the detection of security vulnerabilities to anticipate how an attack will take place. Once a vulnerability is detected, countermeasures are enacted. This philosophy extends to how viruses and other potentially malicious digital files are handled. Presently, there are a variety of techniques for scanning digital files to determine whether any portion of the digital file matches a signature associated with a known virus or malicious code. Once identified, such dangerous files are quarantined and appropriate security measures taken. Unfortunately, due to an increase in exploitation of file format vulnerabilities, attacks that exploit relatively unknown vulnerabilities are becoming more common.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for dynamically adjusting the format of a file to allow the trustworthiness of the file to be ascertained by other parties are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Client Description

Figure 1:
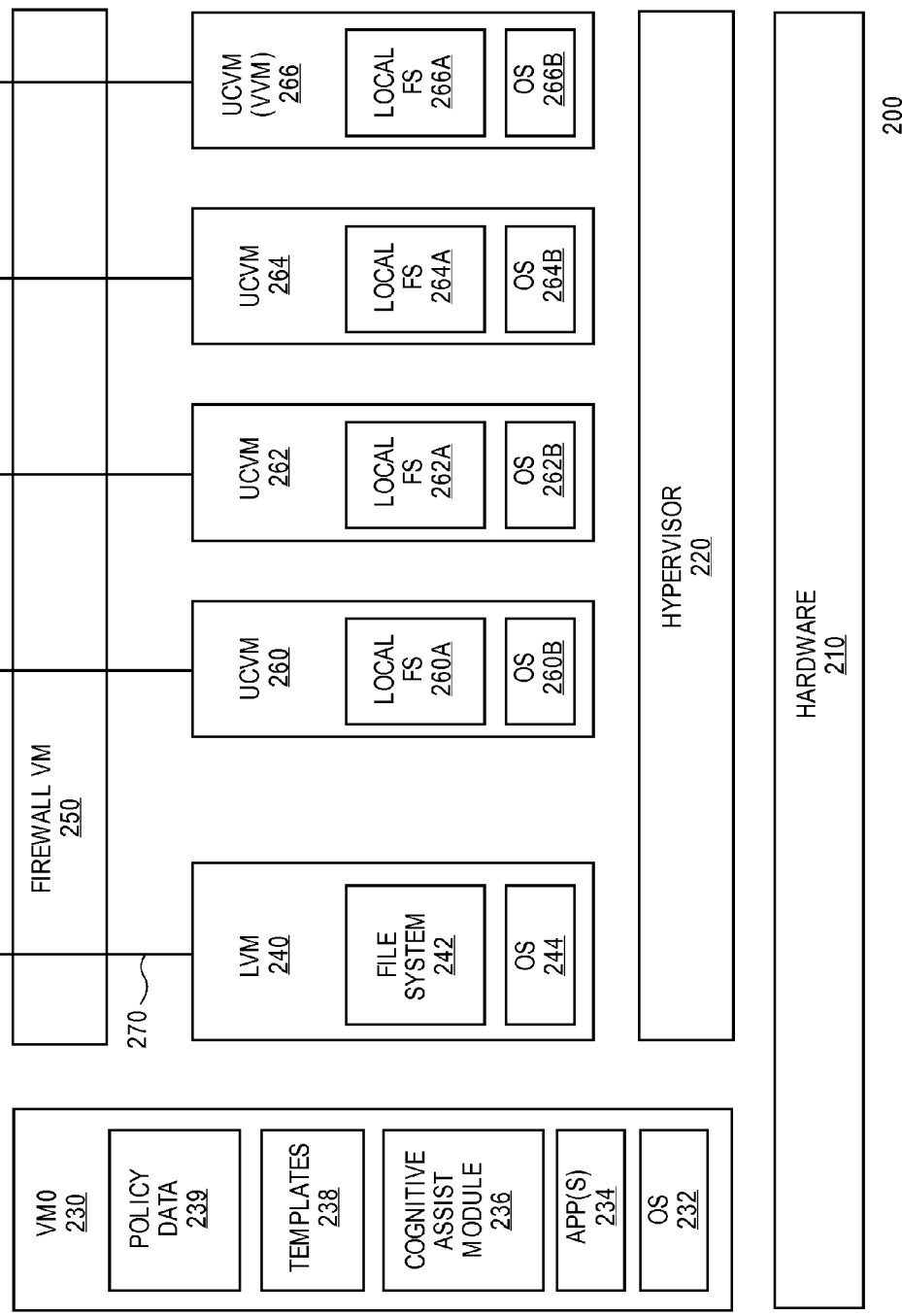
FIG. 1 is an block diagram of the functional components of one embodiment of the invention.

Embodiments of the invention prevent malicious code, introduced into a computer system, from compromising the resources of the computer system through the use of dynamic operating system (OS) micro-virtualization. A computer system of an embodiment includes a number of independent virtual machines (VMs) that each executes a full operating system (OS). A block diagram of client 200 according to one embodiment of the invention is shown in FIG. 1. The term "client," as broadly used herein, represents any type of Internet endpoint or computer system capable of connecting to a network and executing a virtual machine. Non-limiting, illustrative examples of client 200 include a PC, a laptop computer, a tablet computer, a cell phone, a personal digital assistant (PDA), and the like.

In an embodiment, client 200 may correspond to a server. Thus, while use of the term "client" in other contexts might exclude an interpretation that includes a server, as broadly used herein, client 200 may be embodied on a wide variety of machines, one example of such being a server. Thus, as the Applicant may be his or her own lexicographer, as used herein, the term client 200 expressly includes a server. For example, non-limiting, illustrative examples of client 200 include a web server, an application server, a file server, a RPD/x-Windows/SSH server, and a cloud server. Indeed, implementing embodiments of the invention upon a server may yield many benefits. The micro-virtualization techniques employed by embodiments provide an efficient mechanism for eliminating the risk of executing untrusted code and/or interpreting untrusted data in accordance with different policies to manage such risk. As such, a device, such as a server, which interacts with (a) numerous sources of untrusted code and/or data and/or (b) two or more corporate entities having different policies towards managing the risk of untrusted code and/or data, may benefit from embodiments of the invention.

Client 200 includes a number of virtual machines (such as 230, 240, 250, and 260, for example) that execute on hardware 210 of client 200. The various VMs within client 200 may be used for separately executing processes associated with different activities. One such VM, namely "VM0" (i.e., VM0 230 of FIG. 1), is secured so that VM0 may serve as the root of trust with a guaranteed integrity. VM0 may contain core operating system 232 and one or more applications 234. In the embodiment shown in FIG. 1, VM0 is not accessible over any network, such as the Internet. As shall be explained below, VM0 provides a secure environment in which operating system 232 and one or more applications 234 may execute without risk of exposure to malicious code.

Other VMs, such as VMs 260, 262, 264, and 266 in FIG. 1, may be created, maintained, and destroyed on-demand using a very efficient micro-virtualizing hypervisor 220. Using efficient micro-virtualization techniques, the latency of starting and stopping activities or applications which run in their own VM in embodiments is very low, thereby providing a practical user experience while employing full OS virtualization.

Embodiments address and overcome many disadvantages experienced by modern general purpose computer systems that execute code from different sources and of differing trust levels; nevertheless, embodiments maintain compatibility with current typical real-world usage of computer systems by corporate and non-corporate users. This is so because any activity which is not previously deemed trustworthy is performed in a separate VM by certain embodiments, and so all code which may be potentially malicious is executed in its own VM that is destroyed after its immediate use is ended, thereby preventing any malicious code from effecting any lasting change to a computer system according to an embodiment of the invention.

The Trusted Virtual Machine

VM0

In an embodiment of the invention, a special virtual machine, referred to herein as "VM0," is created to be a trusted and secure portion of a computer system. FIG. 1 depicts VM0 230 according to an embodiment. To achieve the property of being trusted and secure, VM0 230 may be permanently disconnected from any network (i.e., VM0 230 is not connected to any local network or the Internet). Specifically, VM0 230 may not contain any type of networking stack, such as a TCP/IP network stack, and may not possess or have access to any networking hardware that could allow for communication between VM0 230 or any applications 234 executed thereby and the Internet. Thus, the only way to install software onto VM0 230 may be to have physical custody of client 200 and manually install the software on VM0 230. Note that a client may contain any number of VM0 virtual machines. While FIG. 1 depicts an embodiment comprising a single VM0, other embodiments may comprise two or more VM0s.

In certain embodiments, one or more applications 234 executing within VM0 230 do not have any access to a network, must be fully self contained in their functionality, and must rely only on local code and data for all their functionality. All applications that need to access the network will therefore need to run in a separate virtual machine outside of VM0 230, as shall be described in further detail below. It is envisioned that the software (such as one or more applications 234) running in VM0 230 be selected at the time client 200 is manufactured or first configured for use in a controlled environment. Because VM0 230 is never connected to any type of network, such as a TCP/IP network, all common types of network initiated attacks cannot be waged against VM0 230, thereby rendering VM0 230 immune to such attacks and safe as compared to any computer or VM that is connected to the Internet. Also, in an embodiment, VM0 230 may execute a different type of operating system than used by UCVMs (discussed below) in client 200. In this way, VM0 230 would be immune or resistant from attacks that typically affect the guest operating systems running in the UCVMs of client 200.

In an embodiment where hypervisor 220 is a Type 2 hypervisor, when client 200 is booted, only VM0 230 is started by the BIOS or firmware of client 200. Once VM0 230 is running, VM0 230 can start hypervisor 220 immediately or on demand. In another embodiment, where hypervisor 220 is a Type 1 hypervisor, hypervisor 220 is first started by the BIOS when client 200 is booted and VM0 230 is launched by the hypervisor 220. Hypervisor 220 is a software component that is responsible for creating other VMs which each execute independent instances of the operating system. These additional VMs are instantiated by VM0 230 and/or hypervisor 220 to run any untrusted code or code that needs to access the network. Untrusted code in this context is any code which has not been pre-approved as being trusted by an IT administrator of client 200. The additional VMs are started "silently" and automatically by client 200, e.g., these VMs are started transparently to the user and without the user having to do anything explicit (note that a user may still manually initiate the creation of a VM in certain embodiments). These additional VMs are also not explicitly visible to the user; instead, all the user sees on the desktop is familiar objects (such as icons, windows, and applications) without any indication that multiple VMs are executing in client 200. Embodiments of the invention follow rules that govern what application activities are assigned to which particular VM. These rules are described below in greater detail.

In another embodiment (not depicted in FIG. 1), VM0 230 may have a networking stack that is firewalled off from the network using well-tested firewall software, thereby allowing VM0 230 to have access to a computer network. Such an embodiment may only allow connections with a specific Internet system so that the software inside VM0 230 may be updated from a designated update server. For example, the firewall software may only allow VM0 230 to connect to one or more servers associated with the IT administrator of client 200 and may prevent VM0 230 from establishing a connection with any other endpoint on any network.

In an embodiment, VM0 230 may communicate with other components of client 200 using secure channels. For example, VM0 230 may communicate with other entities in client 200 using a shared memory channel mediated by a hypervisor. Thus, VM0 230 is not isolated from the remainder of client 200, but nevertheless, processes and data within VM0 230 are resistant from external attacks.

Interaction with an User Interface

All code responsible for generating a user interface (UI) not associated with an application may be maintained in VM0 230. Consequently, all UI interaction activity with the desktop between a user and software executing on client 200 may take place between the user and VM0 230, which maintains a unified desktop for all applications running in all VMs. Interaction between the user and applications running in VMs other than VM0 230 takes place indirectly via VM0 230. For example, when the user enters a password for a web site whose browser and HTML/Javascript code is running in an untrusted VM, the password is first directly provided to VM0 230, which then transfers the information to the untrusted VM. Furthermore, the untrusted VM's display is rendered on to a virtualized display, which is then composed into the VM0 230 desktop (as appropriate) by controlling code running in VM0 230. As code executing in VM0 230 is trusted, the user may trust any user interface controls displayed on a screen since all code responsible for rendering the user interface is trusted.

This approach is quite different from prior systems where often the code that controls the full desktop experience is untrusted. Consequently, if the code responsible for generating the user interface is corrupted by malware, then the user interface may be used as a tool to deceive the user. For example, malware may cause a user interface control to be displayed that requests the user to submit an authentication credential which will be used for improper purposes by the malware. However, this problem is overcome by embodiments of the invention—since all code responsible for rendering user interface controls executes in VM0 in an embodiment, malware is prevented from hijacking or corrupting UI-rendering code.

The Legacy Virtual Machine

LVM

FIG. 1 depicts a legacy virtual machine (LVM) 240 according to an embodiment of the invention. LVM 240 may contain operating system 244. LVM 240 serves as the primary entity being managed by the IT administrator of client 200. As such, LVM 240 provides an environment that is analogous to the managed enterprise OS of corporate computer system in that an IT department may install and maintain various enterprise applications within operating system 244 of LVM 240. In an embodiment, operating system 244 of LVM 240 may correspond to a Microsoft Windows OS or any other general purpose OS such as Linux or MacOS.

In an embodiment, LVM 240 is responsible for storing the main file system 242 of client 200. File system 242 may contain the user's profile folder containing the user's settings and files.

LVM 240 typically only runs infrastructure OS programs and programs that are used for the purpose of managing client 200 and trusted enterprise applications. Other user programs (especially those that involve external components or consume untrusted data) do not run in LVM 240, but instead, run elsewhere in separate VMs (such as a UCVM as described in more detail below).

In an embodiment, the network access of LVM 240 is restricted to just the corporate network as implemented by firewall VM 250. Firewall VM 250 is a specialized virtual machine that comprises firewall software/applications to restrict network access of VMs running in client 200 to appropriate and/or necessary network access points. Such practice is consistent with the need for only the responsible IT administrator to be capable of connecting to LVM 240 to manage LVM 240 and processes executing therein.

In one embodiment, LVM 240 and VM0 230 may be implemented in a single virtual machine.

Untrusted Code Virtual Machine

UCVM

When a user wishes to run any application that requires access to either a network or untrusted data (untrusted data is any data that originates from outside client 200), the application is run inside a dedicated VM that is created on-demand by hypervisor 220. This dedicated VM is called an Untrusted Code Virtual Machine (or UCVM). FIG. 1 depicts several UCVMs, namely UCVM 260, 262, 264, and 266. A UCVM operates under the assumption that, in general, any code that connects to the network and interacts with arbitrary code executing on an external device may at some point be compromised. This assumption also applies to trusted applications that interact with data originating from outside the computer system executing the trusted application, because such data may, at some point, contain embedded malicious code. To address such possibilities, such applications are executed in a UCVM to prevent any malicious code, inadvertently introduced into the UCVM, from having the capacity to affect any change outside of the UCVM.

In an embodiment, a UCVM is created by (a) cloning a copy of LVM 240, or a stripped-down version of LVM 240, in memory and (b) providing access to a restricted file system to the newly created UCVM. For example, UCVM 260 comprises restricted file system 260A, UCVM 262 comprises restricted file system 262A, and UCVM 264 comprises restricted file system 264A. Each UCVM possesses its own instance or copy of the operating system, which is isolated and separate from the main operating system (including its code and data) executing within VM0 230 or LVM 240. For example, UCVM 260 comprises operating system 260B, UCVM 262 comprises operating system 262B, and UCVM 264 comprises operating system 264B.

To provide a low latency user experience, UCVMs may not be booted from scratch each time an application is needed to be started. Instead, a UCVM may be created very quickly by cloning the UCVM from a template VM (with a booted OS) that has been pre-loaded in memory at system boot time. In an embodiment, the template used to clone a UCVM may be selected from templates 238 stored in VM0 230. A variety of techniques can be employed to make this cloning operation as fast as a few 100 milliseconds. Multiple types of templates may be used by a system to create UCVMs depending the nature and type of application(s) to be run inside the UCVM, as discussed in greater detail below in the section entitled "Cloning a UCVM from a Template."

Cognitive assist module 236 is software that is responsible for implementing the rules and policies of embodiments as well as helping the user of client 200 in understanding and navigating the security model employed by client 200 on an as-needed basis. Cognitive assist module 236 helps decide what activities run in which UCVMs, including when VMs are created or destroyed, and what kind of access to network and file system resources each UCVM has. Cognitive assist module 236 also helps protect the user, e.g., when a user is fooled by malware running in a UCVM and is in the process of providing some information that they have previously provided to enterprise code running in LVM 240 (for example a password), then cognitive assist module 236 may detect this situation and prevent the user from providing the information (which may be secret corporate information) to the malware.

Regarding the restricted file system of each UCVM, each UCVM has access to a private copy of a subset of the files in file system 242 on client 200. A UCVM may only have access to those files which the UCVM should need for the correct operation of the application executing therein. For example, user files are usually not required for correct operation of an application executing in a UCVM and thus are not typically exposed to a UCVM. On the other hand, if a UCVM is created as a result of the user wishing to edit a document using an application, such as MS Word, then a copy of the document the user wishes to edit will be provided to the restricted file system of the UCVM at the time the UCVM is created. Advantageously, using UCVM 260 as an example, if a process executing within UCVM 260 makes any changes to any files in restricted file system 260A, then these changes do not impact the files stored in file system 242 maintained in LVM 240 because such changes are only made to restricted file system 260A maintained in the UCVM and are not propagated, without express consent from the user, to file system 242 maintained by LVM 240.

In a typical use case of a UCVM, the UCVM may run a local application or an individual web page session. When a user is done running the local application or navigates away from a web page to another page with a different Internet URL domain, the corresponding UCVM is destroyed. Any new local application or web application will be run inside a brand new, separate UCVM that is cloned again from a clean UCVM master template. Thus, if there has been any compromise to the UCVM during the course of running some malicious code that was introduced into the UCVM, then the adverse affects of the security breach are isolated to only the affected UCVM and are lost when the UCVM is destroyed.

For example, assume that a user double-clicks on a MS Word document icon in Windows Explorer. Embodiments create a special UCVM to run the MS Word process. In a particular embodiment, cognitive assist module 236 of VM0 230 may dynamically create the UCVM using a template in one or more templates 238 or use a pre-existing template in memory or on the disk. The template selected by cognitive assist module 236 may be selected based on what activity is to occur within the UCVM, i.e., the selected may be designed to create a UCVM having characteristics that are optimal for running a text editor therein. The created UCVM contains a copy of the operating system as well as a restricted (local) copy of the file system. This local copy of the file system in the UCVM contains all the usual Windows and Program files; however, the user's profile folder in the local copy of the file system contains only the single target MS Word document being opened.

As another example, assume that three tabs are open in a web browser and further assume that each tab is open at a different web page. In consideration of the code which may be contained or embedded on a web page, each web page may be properly considered a web application. In embodiments of the invention, the code responsible for rendering the user interface (UI) of the web browser runs in VM0 230. On the other hand, executable code for the three web applications runs in three separate UCVMs. A core HTML/JavaScript engine runs in each of the three UCVMs. A copy of the file system within each of the three separate UCVMs does not contain any part of the user's files, as they are not required for the task performed by each UCVM, namely displaying a web page. Thus, each web application (or web page in this example) is completely isolated from the rest of the system.

In an embodiment, a UCVM may be connected to the Internet according to an access policy determined by the nature of the code running within the UCVM. To illustrate, web pages are typically restricted as per a strict "same origin policy" similar to the rules implemented by modern web browsers. In the "same origin policy," scripts running on web pages are permitted to access methods and properties of other scripts originating from the same site with no specific restrictions, but are prevented from accessing most methods and properties across web pages on different sites. Untrusted native applications running outside of the web browser are restricted by default to be able to connect only to the domain from which the program was downloaded (and to specific content delivery networks (CDNs) that may be in use by the domain in question).

This level of network access for downloaded applications can be explicitly changed (increased or decreased) by the end-user to include additional sites on the Internet. End-user control over what a UCVM can connect to may be subject to certain limitations related to corporate networks and sensitive web sites (such as a bank and web mail provider). For example, any code running in a UCVM may not, in general, access any site on a corporate Intranet to which client 200 is connected. Applications that need to connect to the corporate Intranet may need to be signed by the IT administrator of the domain. Similarly, non-web untrusted application code in a general UCVM may not connect to a web site associated with a search engine or bank or other sites that may have been previously identified as being "off limits." These connections can only be made through a web browser (which spawns UCVMs bound to these special domains) or from a special purpose LVM called a VVM, which described in further detail below.

In an embodiment, there is no communication channel available for an application running in one UCVM to communicate with an application running in another UCVM. Thus, applications running in UCVMs are completely isolated from each other and from the other applications in the system. This is well suited for running downloaded third party local applications which are generally designed to be self-contained or for Internet applications (web pages are not supposed to rely on any communication between applications within the web browser). In an alternate embodiment, communication between an identified set of virtual machines can be enabled by a person with sufficient privileges, such as an IT administrator for client 200.

Firewall Virtual Machine

In an embodiment, the implementation of the network access restrictions is done in a dedicated VM called a firewall VM. FIG. 1 depicts an exemplary firewall VM 250 of an embodiment. Firewall VM 250 runs an isolated operating system with a dedicated and fixed set of firewall applications that implement the network access policy for all VMs in client 200 (except perhaps VM0 230, which may not have any network access). Firewall VM 250 may provide, to any virtual machine running on client 200 in which untrusted code is executed or untrusted data is being interpreted, restricted access to only those network resources deemed necessary on an as-needed basis in accordance with a policy described by policy data stored on client 200.

In another embodiment of the invention, the firewall functionality of the system may be co-located and implemented inside either the hypervisor 220 of FIG. 1, or inside the LVM 240 of FIG. 1 (working in conjunction with the hypervisor 220 of FIG. 1), or inside VM0 230 of FIG. 1 (working in conjunction with the hypervisor 220 of FIG. 1).

Validated Virtual Machines

VVMS

UCVMs are not appropriate to run local applications that interact heavily with each other using local APIs such as COM, as typically there is no communication channel available for an application running in one UCVM to communicate with an application running in another UCVM. Embodiments may employ one (or more) special UCVMs called a Validated Virtual Machine (VVM) for the purpose of running relatively trusted local applications that have complex interactions between the applications. Such complex interactions are common in enterprise frameworks containing multiple applications, such as Microsoft's Office Suite and IBM's Lotus Notes.

FIG. 1 depicts an exemplary VVM 266 of an embodiment. Note that while FIG. 1 depicts a single VVM for ease of explanation, other embodiments of the invention may employ two or more VVMs or no VVMs based upon the particular needs of the user and/or policies of the organization responsible for or the owner of client 200.

Applications need to be signed and configured for co-location in the same VM by an administrator of client 200 before they can run in VVM 266. Inside VVM 266, signed applications can interact with each other using all types of APIs and frameworks supported by the OS being used. In an embodiment, the default network access policy of a VVM is to allow access to a corporate network only. The IT administrator may increase or decrease this level of access, subject to certain restrictions.

In an embodiment, specific signed applications or suites (groups of applications) that originate from a trusted source (other than the enterprise) may also be designated to run together in a particular VVM responsible for applications originating from that source. For example, all non-corporate applications that are signed by a specific vendor may be run together in a single VVM. These applications would then be isolated from corporate applications and general untrusted applications, but not from one another. A specific network access rule that is more permissive than the "same origin policy" used for web applications and unsigned applications may be used for a VVM. The restricted copy of file system 242 exposed to a VVM is similar to that exposed to a generic UCVM in that the restricted copy of file system 242 exposed to a VVM comprises only those files related to, or required for, performance of the applications executing within the VVM.

The Restricted File System Exposed to a VM

Figure 2:
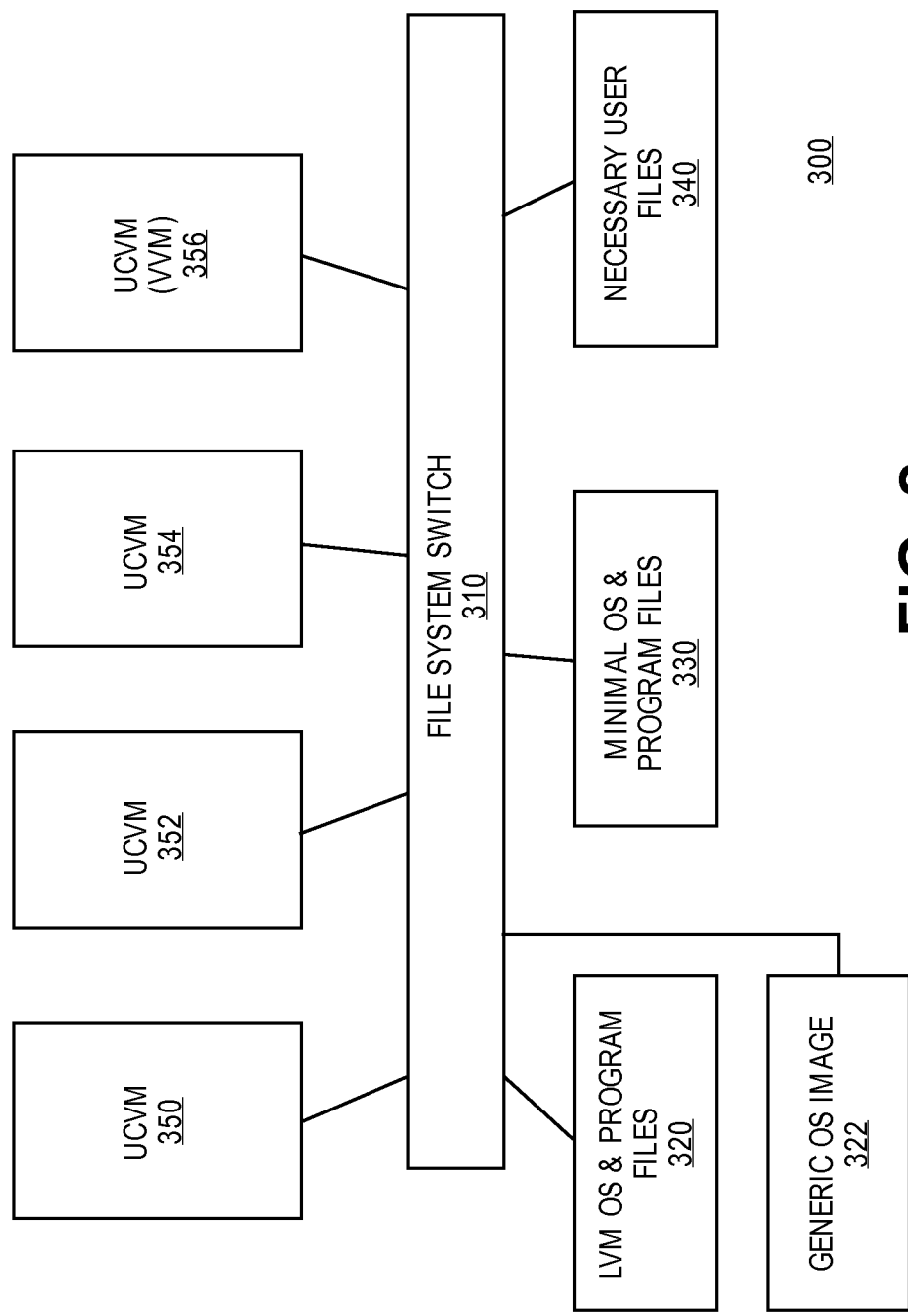
FIG. 2 is block diagram of the functional components involved in exposing a restricted copy of the file system to different UCVMs (and VVMs) according to an embodiment of the invention.

FIG. 2 is block diagram of the functional components involved in exposing a restricted copy of file system 242 to different UCVMs (and VVMs) according to an embodiment of the invention. File System Switch 310 is software that is configured to provide the newly created UCVM with access to a copy-on-write clone of the OS image that the UCVM was created from once the UCVM has started. The minimal operating system and program files 330 in the copy-on-write clone may be created from either the corporate LVM OS image 320 or a separate generic stripped down OS image 322 which may be created by the IT administrator.

Furthermore, a newly created UCVM is provided a copy of necessary user files 340, which are a subset of the user files in file system 242. The composition of necessary user files 340 will be different for each user. The set of files comprising the user files in file system 242 maintained in LVM 240 are typically those files in the user's home folder, e.g., c:\Users\<username>. The particular copies of files that are provided to a particular UCVM as necessary user files 340 are the minimum set of files that are needed by that UCVM to accomplish what the user intended to do as captured when the target application was being invoked. For example, if the user double clicked on a specific MS Word file named ABC.docx at the location c:\Users\<username>\Documents in the file system 240 maintained in LVM 240, then necessary user files 340 would only include a copy-on-write clone of the ABC-.docx file and only this copy-on-write clone of the ABC.docx file is made available in the virtual c:\Users\<username>\Documents folder made visible to the newly created UCVM running the MS Word application. If a program (like MS Word) was started without any association with a file, then necessary user files 340 would correspond to an empty c:\Users\<username>\Documents virtual folder.

Any application running in a UCVM therefore only has access to the particular set of user files provided explicitly by the user when the program was invoked. Subsequently, if the user wants to browse file system 242 for another file from within the application (for example, by using the File->Open menu item of MS Word), then he or she will see a restricted user files directory.

Figure 3:
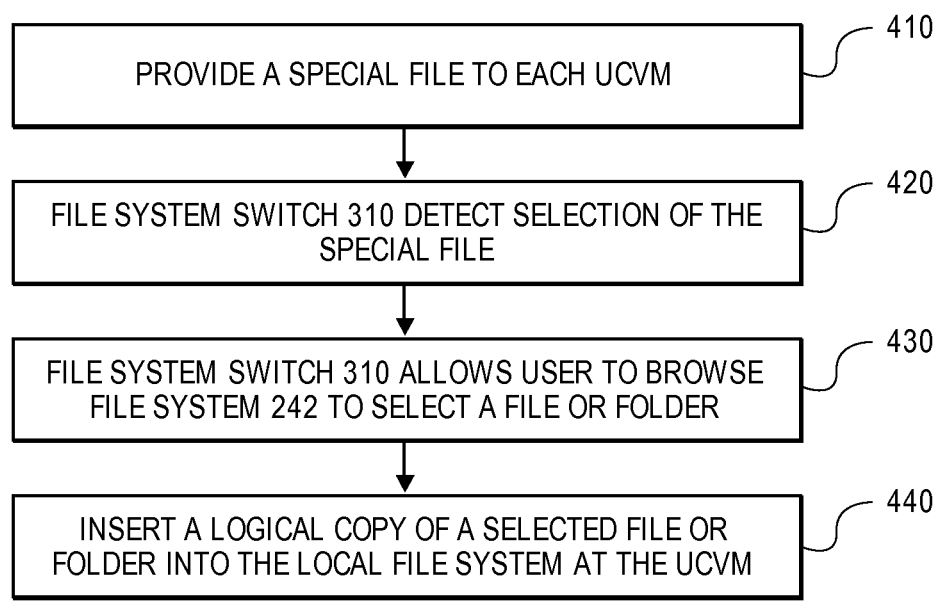
FIG. 3 is a flowchart illustrating the steps involved in a UCVM obtaining a copy of a new user file maintained in the file system stored elsewhere according to an embodiment of the invention.

To enable the user to select files from the user's own User Files folder in file system 242 maintained in LVM 240 using an application executing within an UCVM, a user interface may be provided to allow the user to browse his or her files in file system 242, select one or more of the user files, and expose a copy of the selected files to the appropriate UCVM. For example, FIG. 3 is a flowchart illustrating the steps involved in a UCVM obtaining a copy of a new user file maintained in file system 242 according to an embodiment of the invention. In step 410, a special file is provided to each UCVM. The special file may be provided to the UCVM in a number of different ways, e.g., the special file may be inserted into each folder of the virtual C:\Users\<username> directory provided to each UCVM. This special file may be named something akin to "Show All My Files" or the like, as its selection will be used to trigger exposing additional copy-on-write clones of files stored in file system 242 to the UCVM.

In step 420, File System Switch 310 detects when the special file is selected by the user. For example, when a program executing within a UCVM browses to the special file, presumably as a result of a user click, this action may be trapped by File System Switch 310.

In step 430, File System Switch 310 invokes a dialog with LVM 240 that allows the user to browse the full file system 242 maintained in LVM 240. The user may then select a file or folder in file system 242. Note that at this stage, the user may be granted read access to the full file system 242 for purposes of selecting a file or folder, but the user is not granted write access to file system 242. Therefore, the user is prevented from modifying file system 242 maintained by LVM 240 in any way.

In step 440, after the user selects a file or folder, a copy of the selected file or folder is created. The copy of the selected file or folder is then inserted into the restricted file system associated with the UCVM. As a result of inserting the copy of the selected file or folder in the restricted file system associated with the UCVM, an application executing in the UCVM may have read and write access to the copy of the selected file or folder in the virtual file system, but is prevented from effecting any change to the original copy of the selected file or folder in file system 242 maintained by LVM 240.

The steps of FIG. 3 ensure that files in file system 242 maintained by LVM 240 are not visible to a UCVM without explicit permission from the user. Malicious code running in a UCVM, for example, cannot programmatically access files in file system 242 in LVM 240. Further, malicious code running in a UCVM also cannot render a false user interface to trick the user into unintentionally providing any user files to the malicious code, since all code responsible for rendering the user interface is maintained within VM0 230, and thus, unreachable by the malicious code.

File System Switch 310 may be implemented in a variety of ways. For example, in one embodiment, File System Switch 310 may be implemented by a network file system protocol (NFS or CIFS may be used). A special VM (or LVM 240) may be used as the OS serving the "User Files" shared file system. Other VMs "mount" this shared file system using NFS or CIFS (or another network file system) from the hosting VM. Application software in the hosting VM may decide what files are exposed to which VM based on instructions provided by VM0 230.

In another embodiment, File System Switch 310 may be implemented, in part, by a proprietary protocol for handling communications between the different UCVMs and File System Switch 310. File System Switch 310, in such an embodiment, may be implemented as part of a special VM or in LVM 240.

Cloning a UCVM from a Template

In an embodiment of the invention, every virtual machine created in client 220 is instantiated using a template selected from one or more templates 238 stored in VM0 230. In an embodiment, each template in one or more templates is either immutable or may be updated in a very controlled fashion. Advantageously, virtual machines may be instantiated in this fashion with requiring the booting of the virtual machine.

Each of one or more templates 238 may be used to instantiate or create a virtual machine with different characteristics or operational parameters. The characteristics or operational parameters described by a template may be configured, tailored, or suited for a particular context or type of processing activity. For example, each template may specify what type of code is to be run within a virtual machine created using the template, a size of the virtual machine created using the template, firewall settings for the virtual machine created using the template, what type of virtual machine (for example, a VVM, UCVM, or a LVM) is the be created using the template, how changes to a local file system within the virtual machine created using the template are to be persisted, and what portion, if any, of the network can a virtual machine created using the template access.

One or more devices internal to client 200 or externally connected to client 200 may interact with one or more processes executing in a virtual machine within client 200. In an embodiment, a template may assign responsibility for a selected set of devices to a virtual machine created using the template. In other embodiments, responsibility for a selected set of devices may be assigned to a particular virtual machine by virtue of policy data stored on client 200. Such policy data may describe one or more policies provided to client 200 from an owner or responsible organization of client 200. Policy data of this nature may be maintained by VM0 230 or LVM 240, for example, in certain embodiments.

In an embodiment, one or more templates 238 may be arranged in a hierarchy such that there is a root node corresponding to a template having a default set of characteristics. The root node may have one or more child nodes, and each of these child nodes may be associated with a template that inherits the properties of the parent template, but contains additional or changes properties associated with that child node. Naturally, each child node may also have children, and so the hierarchy of templates may be an arbitrary number of levels deep, where each template inheriting characteristics of its parent, but yet each template is capable of further defining or changing characteristics that distinguishes the template over its parent.

Branches of the hierarchy of templates may be associated with, or more particularly suited, different types of activity. For example, certain templates may be associated with corporate activity, and may therefore specify characteristics related to virtual machines running corporate applications. Similarly, certain templates may be associated with the user's personal application's activity or Internet/Web related activity, and may therefore specify characteristics related to virtual machines running the user's own applications or Internet/Web applications respectively.

Figure 4:
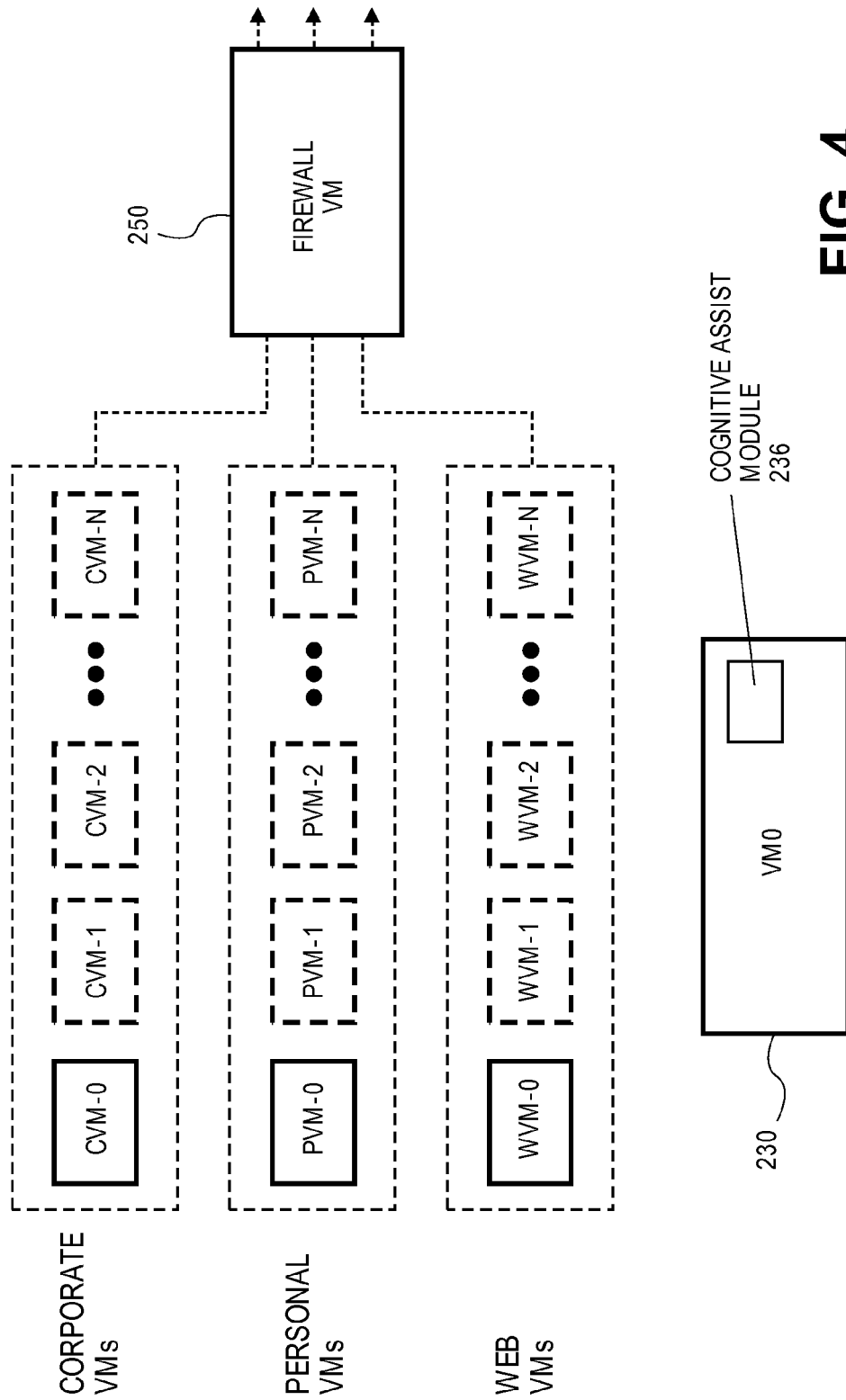
FIG. 4 is an illustration of instantiating a plurality of different virtual machines using different templates according to an embodiment of the invention.

FIG. 4 is an illustration of instantiating a plurality of different virtual machines using different templates according to an embodiment of the invention. In FIG. 4, CVM-0 represents a template that defines a virtual machine having characteristics suitable for running a corporate application, PVM-0 represents a template that defines a virtual machine having characteristics suitable for running a user application (non-corporate), and WVM-0 represents a template that defines a virtual machine having characteristics suitable for running an Internet application. Other embodiments of the invention may define a variety of other templates to define different types of templates. In the example of FIG. 4, cognitive assist module 236 in VM0 230 may use CVM-0 to instantiate one or more corporate virtual machines, such as CVM-1, CVM-2, etc. Similarly, cognitive assist module 236 may use PVM-0 to instantiate one or more personal (non-corporate) virtual machines, such as PVM-1, PVM-2, etc., and cognitive assist module 236 may use WVM-0 to instantiate one or more web-based virtual machines, such as WVM-1, WVM-2, etc. As depicted in FIG. 4, each instantiated UCVM connects to an external network through Firewall VM 250. Cognitive assist module 236 can either create these templates on demand or create and store them while monitoring the usage of the client.

Security Afforded by Embodiments

Embodiments of the invention provide a secure environment to prevent malicious code from affecting any lasting change in a computer system. Arbitrary code (either a web application or a native executable) runs inside an isolated operating system running on an isolated virtual machine. This code has no access to any other application (either a native application or a web application) being run by the user because those applications run in other operating systems running in separate virtual machines. Moreover, arbitrary code has access to only the specific part of the file system that is needed for correct execution of the code. Access to additional parts of the file system has to be provided by code that runs in VM0 (which is secure and fortified against unauthorized intrusion) and any increased access needs explicit authorization from the human user.

Specific trusted code that needs to interact in a complex way with other applications may be explicitly designated to run together inside the same designated VM. This type of VM also has limited access to the file system.

All code and files have limited network access to just what that code needs for its correct execution. All virtual machines are created from templates stored in VM0 which are either immutable or can be updated in a very controlled fashion. Consequently, if a security bug exists in a piece of code, the effect of the security bug is isolated ("space limited") because the compromised code has access to only a limited part of the file system, the network, devices, etc. Moreover, the effect of the security bug is "time limited" because the virtual machine that has been compromised will be subsequently discarded and a new virtual machine is created for future application instances from a clean immutable VM template.

Using Policy Data to Manage the Deployment of Virtual Machines

Embodiments allow code that originates from arbitrary external sources to be safely executed by a client. In this way, digital content of unknown trustworthiness may be safely received and potentially executed and/or interpreted by a client without incurring the risk that the digital content contains malicious code that could cause undesirable consequences.

The 'digital content' received by the client from an external source may correspond to any type of digital data, such as executable code or non-executable, interpreted data for example. Since malicious code may be carried within certain types of non-executable data and subsequently spread when the data is interpreted by applications, embodiments treat all incoming digital content as being capable of containing malicious code, even if the digital content is not in a recognized executable form. Non-limiting, illustrative examples of digital content include an ".exe" file, an application, a collection of applications designed to run together, a portion of an application, an email attachment, a slide presentation, a text document, and a web page (which essentially is a portion of an application, namely a web browser). Even though the email attachment, the slide presentation, and the text document, in and of themselves, are not executable files, embodiments of the invention treat these forms of digital content as potentially carrying malicious code.

To manage the risk posed by receiving digital content of unknown trustworthiness, any digital content received by a client is stored in one or more virtual machines. In an embodiment, digital content received from an external source may immediately be stored in one or more virtual machines upon receipt. Alternately, digital content received from an external source may be stored in an intermediate location, such as a local cache, prior to storing the digital content in a virtual machine.

While embodiments are configured to process all digital content originating from an external source in a virtual machine, the complexity of determining in which virtual machine the digital content should be stored and how that virtual machine should be configured is hidden from the user whenever possible or appropriate. To accomplish this goal, techniques are discussed herein for programmatically managing a plurality of virtual machines on the client to accommodate the wide variety of use cases for receiving digital content at a client. However, in some cases, explained in more detail below, it may be appropriate to inform the user of certain activity concerning a virtual machine, such as when obtaining express permission from the user is advisable before performing an action.

Certain sources of digital content are more trustworthy than other sources. For example, the web site of a bank or Fortune 500 company may be more trustworthy than the web site of a smaller company or lessor known organization. Also, applications may have different operating needs, e.g., certain applications may be designed to work closely with other applications or require access to network resources. Thus, in an embodiment, the attributes of each virtual machine are specifically tailored to reflect the type of digital content and/or applications operating or stored therein.

To illustrate how one embodiment operates, when a client determines that digital content, originating from an external source, is to be received or processed by the client, the client may identify, without human intervention, one or more virtual machines, executing or to be executed on the client, into which the digital content is to be received. To do so, the client may consult policy data, such as policy data 239 stored at client 200 of FIG. 1, to determine a placement policy, a containment policy, and a persistence policy used in identifying the one or more virtual machines into which the digital content is to be received.

The policy data may be used to specifically tailor the operation of each virtual machine to reflect the type of digital content and/or applications operating or stored therein. The placement policy identifies a particular virtual machine into which the digital content is to be stored, the containment policy identifies what network resources and client resources the particular virtual machine can access, and the persistence policy identifies whether data (or a part of it) stored in the particular virtual machine is persistently stored. Naturally, the placement policy, containment policy, and persistence policy are, to a certain extent, intertwined, as the resources a virtual machine may access and whether data stored therein is persisted will affect what applications/digital content are appropriate to reside therein.

In an embodiment, each of the placement policy, the containment policy, and the persistence policy may consider a variety of different factors. For example, the placement policy, the containment policy, and/or the persistence policy may consider a historical record of use for the client in identifying a virtual machine. The evaluation of a policy may involve consulting a historical record of how the client, or applications running thereon, has been used. In this way, if a particular action has been judged to be more safe (or less safe) over a period of time, the manner in which the action is handled by the policy may evolve over time. To illustrate, in an embodiment, if a particular network resource, such as an affiliate corporate web page, is demonstrated to be sufficiently safe over a period of time, then this web page may be processed using relaxed restrictions, e.g., by a web browser in a virtual machine already handling another trusted web page as opposed to instantiating a new virtual machine to handle the affiliate corporate web page. On the other hand, if the historical record of use demonstrates that an action involving a particular network resource or client resource may pose some risk to the client, then the policy may subsequently handle this action more sensitively than before, e.g., by assigning code to handle the particular network resource or client resource in a dedicated virtual machine with restricted access to client and network resources.

As another example of the types of factors which may be considered by a policy, one or more of the placement policy, the containment policy, and the persistence policy may consider a current physical location of the client or to which networks the client currently has access in identifying one or more virtual machines which should be used to receive content. In this way, which networks are available to the client, the IP address assigned to the client, the current location of the client based on global positioning service (GPS) data, and the current location of the client based on an IP address or which networks are available to the client may all be considered when determining which virtual machine should receive digital content and what restrictions should be placed on that virtual machine. In this way, when the client is physically located in an area deemed safe (such as a work office or home), digital content received by the client may be handled by a virtual machine having a set of lesser restrictions than when the client is physically located in an unknown area.

As another example of the types of factors which may be considered by a policy, one or more of the placement policy, the containment policy, and the persistence policy may consider the proximity of the client to a wireless device, such as a Bluetooth enabled cell phone. For example, if the client is not within a configurable distance to the cell phone of the user of the client, then the client may receive digital content using a set of greater restrictions, e. g., code executing in all virtual machines may be denied access to certain client resources and/or all network resources. Embodiments may determine whether the client is within a configurable distance to a wireless device using a variety of different methods, such as accessing the wireless signal strength between the client and the wireless device.

In an embodiment, at least a portion of the policy data, used in identifying one or more responsible virtual machines to receive digital content, is obtained from a remote server after the client determines that digital content is to be received from an external source. In this way, policy data may be sent, as needed, from an IT administrator to the client. The client may treat any policy data already residing on the client in the same manner as policy data retrieved from a remote server. For example, when a user of the client performs an action, the client may consult a remote server to see if the remote server has any additional policy data regarding this action. Following this procedure, an IT administrator can maintain a high level of control on how the client will manage virtual machines running on the client. This enables the IT administrator to make adjustments to the security model followed by the client in real-time. The client may interact with a human operator at a remote location to obtain additional policy data or may interact with a remote automated system, without human intervention, to obtain the additional policy data. Note that certain embodiments may be configured to consult a remote server for policy data only when a certain configurable action is taken. Therefore, in certain embodiments, the client need not always contact a remote server to determine if additional policy data is available each time that the client is to receive new digital content.

In an embodiment, the policy data may specify that the virtual machine assigned to receive digital content can only access a limited subset of the metadata properties for a client resource or a network resource. For example, a virtual machine may not be capable of determining what local wireless networks are available in the vicinity or whether the network card of the client is of a particular type. In this way, the amount and type of information exposed to a particular virtual machine may be controlled to a fine level of granularity.

Use of the placement policy, the containment policy, and the persistence policy by certain embodiments will be discussed in further detail below.

Placement Policy

The placement policy identifies a particular virtual machine into which the digital content is to be stored. The particular virtual machine identified by a placement policy in which digital content is to be stored may be an existing virtual machine or a new virtual machine that has not yet been instantiated. In the case where the placement policy specifies that the digital content should be received by a virtual machine that has not yet been instantiated, either the placement policy itself or some other location in the policy data will identify a template for use in instantiating the particular virtual machine. The identified template will describe characteristics of a virtual machine suitable for receiving the digital content.

The placement policy may weigh a variety of different considerations in determining which virtual machine should store the digital content so that the digital content may be safely executed, interpreted, and/or processed. For example, a placement policy of an embodiment may assign any file having a certain name or certain attributes to a virtual machine having certain characteristics. To illustrate, a placement policy may indicate that all signed executable files from an internal organization or company are to be assigned to a virtual machine having a specified set of characteristics. As another example, the placement policy may instruct untrusted applications to execute in separate virtual machines so that each untrusted application is isolated from other applications and data of the client.

The placement policy of an embodiment may identifies a plurality of classes of virtual machines, where each class of the plurality of classes is associated with a different trust level for external sources of digital content. Code executing in a virtual machine cannot access external sources associated with less trustworthy external sources of digital content. For example, assume there are three classes of virtual machines, where the first class of virtual machines is designed to run web browsers accessing web sites of financial institutions and email providers, the second class of virtual machines is designed to run web browsers accessing web sites of Fortune 500 companies, and the third class of virtual machines is designed to run web browsers accessing all other web sites. In this example, a web browser executing in a virtual machine that is associated with the third class cannot access any web sites from Fortune 500 companies or financial institutions and email providers. Similarly, in this example, a web browser executing in a virtual machine that is associated with the second class cannot access any web sites from financial institutions and email providers.

The placement policy of an embodiment may identify the particular virtual machine into which the digital content is to be received by observing application dependencies. Such a policy recognizes that in some instances, it is helpful or even necessary to execute certain applications within a single virtual machine. For example, certain providers of software applications may design their software applications do work together or integrate with each other to a high degree. In this case, it would be advantageous to have applications that are designed to work together to run within a single virtual machine. One way for the placement policy to make this determination would be to ask the user whether an application being installed is dependent upon another application already installed at the client to ensure that both applications may be run in the same virtual machine. While this does expose the notion of a virtual machine to the user, a user need only make a decision of this nature when an application is installed on the client, and thus, this decision may be made by IT administrators or other knowledgeable personal rather than relying upon the end user of the client to make such a decision.

Alternatively, determining whether an application being installed is dependent upon another application may be made programmatically by examining the dependencies during the installation of that application. For example, during the installation of application A, the install process may check if module B is already installed or may require that module B already by installed. In this example, the placement policy may determine then that application A has a dependency with module B and may therefore allow application A to run in same virtual machine as module B.

To illustrate another example, it is initially noted that there need not be a one to one correspondence between a web browser and a web page. For example, a web browser may comprise many tabs, and each tab may display a different web page. In addition, each web browser may have a variety of different plug-in and/or associated programs which may be treated as or considered a separate application. Since a web browser may display multiple web pages of varying trust levels, it is desirable to accommodate a web browser having multiple tabs without requiring that the web pages displayed by each tab reside in the same virtual machine. For example, if a web page contains malicious code, then it would be beneficial to execute it in a different virtual machine from the virtual machine containing the web page of your bank. Therefore, in an embodiment, the placement policy may specify that web page of certain sources should be received in a separate virtual machine. While the user may see a single web browser having two tabs, on the back end this may be implemented in two separate virtual machines that each execute a copy of the web browser and possess one web page to be shown in associated with one tab of the web browser. A practical implementation of web page placement may use a VM per web-site placement policy.

These are merely examples of how a placement policy may be implemented. It is contemplated that actual implementations of a placement policy will be configured based upon the particular needs and concerns of the end user. The containment policy of certain embodiments will now be presented in greater detail.

Containment Policy

The containment policy identifies what network resources and client resources a particular virtual machine can access. Network resources, as broadly used herein, refers to any resource that is external to the client while client resources, as broadly used herein, refers to any resources that is internal to the client. A client resource may include any device, component, and/or data residing on or accessible to the client, such as a digital camera, a network interface card, a digital clock, the current time, files, pictures, and email.

The containment policy is used to ensure that code running within a virtual machine has access to only those resources deemed necessary for normal and intended operation. For example, email attachments should not need access to the Internet (generally speaking), and so they should be opened in a virtual machine that is configured such that it does not have access to the Internet. Contain policies may be used to ensure that the resources of the client that are accessible to a virtual machine are those resources necessary to perform the activity intended to be performed within, e.g., a virtual machine instantiated to open a file may only have access to resources necessary to open, view, and edit the file.

In an embodiment, the containment policy may specify what portion of the network that is available or exposed to code executing within a virtual machine. For example, the containment policy may specify that code executing within a particular virtual machine may access no network resources, all network resources, or a subset of the network resources. Thus, a containment policy may specify that code executing within a virtual machine may access a first set of network resources and may not access a second set of network resources. Embodiments may specify what particular network resources are available to a virtual machine using any level of granularity, e.g., only certain types of network resources may be exposed, only certain properties of network resources may be exposed, or only certain portions of the network may be exposed.

In an embodiment, enterprise applications may be grouped into collections. Groupings may be based on a variety of factors, such as job functions or business unit, for example. Each grouping of applications may be executed within a single virtual machine according to an embodiment.

To illustrate the interaction between the containment policy and client resources, the containment policy of an embodiment identifies each client resource accessible to a virtual machine. For example, a containment policy may specify whether code executing in the particular virtual machine can perform one or more of the following actions: access a USB port on the client, perform a copy operation or a paste operation, access a network to which the client is connected, access a GPS device of the client, location information for the client, or tilt information for the client, access a printer or facsimile machine to which the client is connected, and access a digital camera or screen data for the client. Note that these exemplary actions are not meant to provide an exhaustive list, as a containment policy may be used to specify, with particular specificity, which client and network resources may be accessed by code executing within a virtual machine. In this way, if a new client resource becomes available, such as fingerprint scanning device, the containment policy may be updated to reflect the new client resource available to the client.

In an embodiment involving the receipt of executable code at a client, the containment policy may specify that the executable code is denied access to a user file without first obtaining a user's permission to allow the executable code to access the user file. In this way, virtual machines may be configured to allows request permission each time executable code therein access a user file, thereby allowing the user to be informed of the intentions of the executing code and presumably prevent unauthorized access to the user's own files. Such a permission scheme might be implemented naturally as part of the normal user work flow of picking a file to open by running the permission code in a clean protected VM separate from the VM running the untrusted code which is making the request.

To illustrate the interaction between the containment policy and network resources, the containment policy of an embodiment identifies whether code executing in a particular virtual machine can one or more networks accessible to the client. As another example, the containment policy of an embodiment identifies which, if any, objects stored over a network the virtual machine can access. For example, a virtual machine may be restricted to access a specified set of objects or files on a particular server or a particular set of web pages.

In an embodiment, the containment policy may consider any number of factors, including but not limited an identity of the user of the client, a set of properties of the digital content, a physical location of the client, the current time, a holiday schedule, and a set of administrator-specified policy rules. In this way, the containment policy may assign a virtual machine having more restrictions than usual to receive digital content when the digital content is deemed more likely to contain malicious code. For example, it may be deemed likely that digital content contains malicious code when it is received by the client outside of normal business hours, over a holiday, at a time when the client is outside of the user's home or work office, or when the digital content has certain suspicious properties. In this way, the containment policy may assign suspicious digital content to be received in a virtual machine having additional restrictions appropriate for such suspicious digital content.

These examples of how a containment policy may operate and merely illustrative of some examples and are not intended to be an exhaustive list, as actual implementations of a containment policy will be configured based upon the particular needs and concerns of the end user. The persistence policy of certain embodiments will now be presented in greater detail.

Persistence Policy

In an embodiment, the persistence policy identifies whether data stored in a particular virtual machine is persistently stored. The policy grapples with the issue of whether or not to save state created by untrusted code and if so, whether the state should be stored in an isolated manner or merged back into the main file system of the computer. On one hand, to provide a convenient user experience, it may be helpful to persistently store cookies for a web site. On the other hand, it would not be desirable to persistent malicious code, such as a key logger, that was inadvertently introduced into a virtual machine by malware downloaded into and run in the affected virtual machine.

The persistence policy, hand in hand with the placement policy, should be designed to ensure that any potentially malicious code is not persistently stored, or in the alternative, persistently stored in an isolated way. This way, if malicious code, such as a key logger, is persistently stored, and in any future invocation (execution or interpretation), it is invoked (executed) in the context of a possibly new virtual machine instance separate from any other code, thereby nullifying the risk presented thereby.

To illustrate an illustrative persistence policy, in an embodiment only cookies and cache files are persistently stored in a virtual machine in which a web browser executes. Further, the cookies and cache files associated with a particular web site are only inserted to a virtual machine that is intended to execute a web browser displaying that web site. Thus, cookies and a cache file associated with site A would not be inserted into a virtual machine instantiated to run a web browser to display web site B, but would be inserted into a virtual machine instantiated to run a web browser to display web site A.

The above discussion of a persistence policy is exemplary of certain embodiments and is not intended to describe all implementations of a persistence policy, as a persistence policy will be configured based upon the particular needs and concerns of the end user.

Unified Display

Even though there may be a plurality of virtual machines executing at the client, this complexity need not be exposed to the end user of the client. Thus, the end user should be presented visual content generated from each virtual machine executing on the client in a unified manner to present a single, cohesive presentation to the end user of the client. The presentation of the content should be seamless and close to native as possible.

For example, the end user of the client should interact with a web browser that looks like a known web browser, even though the web browser, at the back end, is implemented using a plurality of virtual machines to execute copies of the web browser and different web pages corresponding to each tab of the web browser.

Seamless Management of Untrusted Data Using Virtual Machines

As previously explained above, data may contain malicious code which can be used to compromise a system. Thus, computer systems of an embodiment handle data of unknown integrity with care to ensure the security and privacy of a computer. Embodiments employ approaches for identifying data which is deemed "untrustworthy." As an example, data which is retrieved by the computer system from an external network may be considered untrusted data.

Once data enters into a computer system, the data may interact with processes of the system. For example, untrusted data may interact with different types of mime-type handlers, the user, and/or a search indexer. Embodiments of the invention strive to allow the user to use the untrusted data, while still ensuring the untrusted data is as contained as possible to combat any malicious code contained therein. Containing the untrusted data would be trivial if the user was prevented from using any untrusted data; however, such an approach would frustrate the user by preventing many common use cases of the computer system. Advantageously, embodiments provide a user experience that is as native as possible to allow the user to have meaningful interaction with untrusted data, but in a safe manner that limits the exposure of client resources to the untrusted data.

When an action is requested to be performed on untrusted data, embodiments may handle the request based on the perceived intent of the user and the amount of risk presented by the requested action. Naturally, a requested action may simply be granted or denied. However, embodiments also allow for the action to be performed in a restricted manner. In such a case, the user may be completely unaware that the requested action was performed in a restricted manner, since the details on how the action was performed by the computer system were not exposed to the user.

To illustrate a concrete example, assume that a user wishes to view a text document that was retrieved over the Internet. Embodiments of the invention may consider the text document retrieved from the Internet as untrusted data. When the user clicks on a displayed icon representing the text document, the user's click causes a request to view the text document to be generated. This request may be redirected by embodiments of the invention so that the request is processed within a different virtual machine from which the request originated. The virtual machine in which this request is processed may have no access to any network, such as the Internet or any corporate network, as well as have no access to any file system. In this way, the request to view the text document may be safely processed in an environment which prevents any malicious code, embedded within the text document, from gaining access to the file system or communicating outside of the computer system. The user need not have any idea that the request to view the text document was redirected to a different virtual machine. From the user's perspective, the request to view the text document was seamlessly processed as expected.

Figure 5:
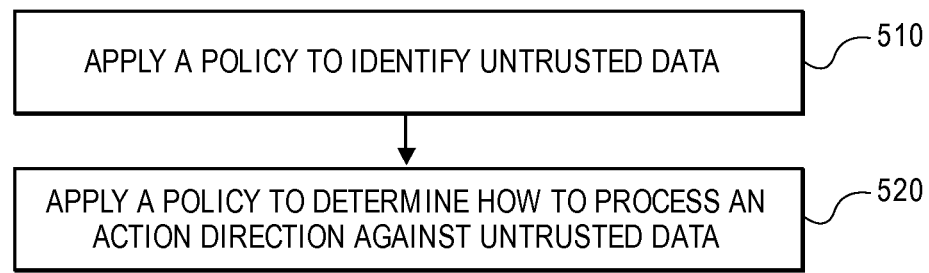
FIG. 5 is a flowchart illustrating the high level functional steps of managing untrusted data according to an embodiment of the invention.

FIG. 5 is a flowchart illustrating the high level functional steps of managing untrusted data according to an embodiment of the invention. As shown in FIG. 5, initially, in step 510, a policy is applied to identify untrusted data. In an embodiment, step 510 may be performed by cognitive assist module 236 applying a policy stored in policy data 239. Thereafter, in step 520, a policy is applied to determine how to process an action directed against untrusted data. Note that any amount of time may pass between the performance of step 510 and step 520. Each of the steps of FIG. 5 shall be discussed below in further detail.

Untrusted Data

In step 510, a policy is applied to identify untrusted data. In an embodiment, step 510 may be performed by cognitive assist module 236 applying a policy stored in policy data 239. However, other embodiments may store policy data describing one or more policies for identifying untrusted data in locations other than VM0 230. Also, in other embodiments, one or more different functional components, other than cognitive assist module 236, may identify untrusted data in step 510.

Untrusted data shall chiefly be discussed herein in terms of being embodied as files which reside on a storage medium, such as a hard-disk drive. Untrusted data, at a high level, is any data, such as a file, which has not previously been identified as being trusted. Different embodiments or implementations may define what constitutes untrusted data differently. For example, untrusted data may include any data which originates outside of a computer system or a trusted domain, such as a corporate network. Untrusted data may be introduced into a computer system a variety of different ways, such as through a DVD, a FireWire cable, a network, a USB port, to name but a few examples.

Alternately or additionally, any data that is created by a program that has been deemed untrustworthy may also be considered untrustworthy. A list of untrustworthy programs may be maintained by embodiments, and any data created by any untrustworthy program on the list will be considered untrustworthy. Similarly, a list of trustworthy programs may be maintained by embodiments, and any data created by a program not on the list of trustworthy programs may be deemed untrustworthy.

Untrusted data may be identified by virtue of the data being created in a specific location, such as a particular folder of a file directory. For example, files created within a network folder in which multiple entities (potentially unknown entities) have write access may be risky to consume, and so any file written to or saved in such a location may be deemed untrustworthy. In certain embodiments, any data that is written by a process having access to the Internet or other specific resources may be considered untrusted data. Any data that is accessed by a particular type of program may also be deemed untrusted data.

An executable file may be deemed untrustworthy based on its behavior. For example, if the executable file opens a connection to the Internet and communicates with untrusted data or an untrusted network, then the executable file or action may be deemed untrustworthy and subsequently any data written by the executable file is deemed untrusted. Thus, embodiments may maintain a list of unacceptable behavior for executable files, and if an executable file behaves in an unacceptable manner, then the executable file will be deemed untrustworthy.

In an embodiment, upon determining that an action is untrustworthy, a responsive action may be performed. To illustrate, embodiments may deny access to a file is the request is considered untrustworthy. Also, characteristics about any action deemed untrustworthy may be described in an entry that is added to an audit log to facilitate future analysis. In an embodiment, if an action is deemed untrustworthy, then an alert to an authority (such as an authentication server, cognitive assist module 236, or other such entity responsible for authentication and/or determining permission levels) may be issued to request permission to access the file.

In an embodiment, if a process reads or otherwise consumes any untrusted data, then the process itself becomes untrusted. Moreover, any data written by the untrusted process would also be deemed untrusted data. To illustrate a concrete example, assume that a particular ".docx" file is deemed untrustworthy. In an embodiment, if an instance of Microsoft Word is used to open the untrustworthy ".docx" file, then the instance of Microsoft Word, as well as any documents written by the instance, will be deemed untrustworthy.

Any data that would otherwise be considered untrusted may be considered trustworthy if the data is signed by an appropriate authority, such as an IT administrator or the like.

The approaches described above may be combined in any manner and in an arbitrarily complex fashion. Thus, embodiments may employ any number of approaches for identifying untrusted data. Certain embodiments may employ policies that consider one or more factors in identifying untrusted data, and each factor in such a policy may be, but need not be, given a different weight.

Ensuring Untrusted Data is Properly Identified

In certain embodiments, data identified as untrusted data in step 510 may be associated with a record (hereinafter an "untrustworthy record") to label the data as untrusted data. This label may be used to ensure that the data remains identifiable as untrusted, regardless of whether the untrusted data is renamed, copied, compressed, uncompressed, decomposed into smaller portions, comprised within a larger entity, etc.

For example, assume that a zip file is deemed untrustworthy. Embodiments of the invention may associate an untrustworthy record with the zip file. If the untrusted zip file is unzipped, then the contents of the zip file should also be deemed untrustworthy. Therefore, the uncompressed contents of the zip file will also be associated with an untrustworthy record. Similarly, renaming the untrusted zip file would not disassociate the untrustworthy record from the untrusted zip file.

As untrusted data may contain potentially malicious code, any process which consumes untrusted data subsequently should be considered untrusted as well, since it may have been corrupted. Thus, embodiments of the invention follow a "transitive law of untrustworthiness" by assuming that any process that reads, consumes, or uses untrusted data becomes itself untrusted. The untrusted process would then be associated with an untrustworthy record. Moreover, any data written by an untrusted process is considered to be untrusted data, and thus, would be associated with an untrustworthy record.

To illustrate an example of this, assume that a text document has been deemed untrustworthy and thus, is associated with an untrustworthy record. If an instance of a Microsoft Word application reads the untrustworthy text document, then an embodiment will associate that instance of the Microsoft Word application with an untrustworthy record to identify that instance as being untrustworthy. If the untrusted instance of the Microsoft Word application subsequently saves another document, then that new document would be considered an untrusted file and be associated with an untrustworthy record.

In an embodiment, each untrustworthy record may contain metadata about the circumstances which lead the associated data to being labeled untrustworthy. For example, an untrustworthy record may identify how the data entered into the computer system. In this way, embodiments of the invention may examine untrustworthy records to extract certain metadata that may be used in determining how to handle the untrusted data. For example, embodiments of the invention described below may employ policies which handle untrusted data different based on how the untrusted data entered the computer system. In this way, untrusted data that enters into a computer system via a perceived lower risk route (such as via a CD or DVD) may be handled in a different manner than untrusted data that enters into the computer system via a perceived higher risk route (such as via the Internet).

As a result of maintaining untrustworthy records for a set of files in a file system, the file system essentially contains two classes of files, namely trusted files (i.e., those files which lack an associated untrustworthy record) and untrusted files (i.e., those files having an associated untrustworthy record.

Performing Requested Actions on Untrusted Data

In step 520 of FIG. 5, a policy is applied to determine how to process an action directed against untrusted data or requested by an untrusted entity. In an embodiment, step 520 may be performed by cognitive assist module 236 applying a policy stored in policy data 239. However, other embodiments may store policy data describing one or more policies for determine how to process an action directed against untrusted data in locations other than VM0 230. Also, in other embodiments, one or more different functional components, other than cognitive assist module 236, may determine how to process an action directed against untrusted data or involving an untrusted requestor in step 520.

In an embodiment, whenever an action is performed is requested to be performed against untrusted data or involving an untrusted requestor, the request is communicated to cognitive assist module 236 so that cognitive assist module 236 may apply a policy to determine whether the request should be granted with full access, denied (which may be embodied as a permission error or an encryption error), or granted with limited access. The policy may consider any number of factors, such as factors concerning the identity of the entity requesting the performance of the action, the manner in which the requesting entity gaining access to the untrusted data, and/or the nature of the requested action.

As a result of applying the policy in step 520, if the request to perform the action is not granted with full access or denied, then it may be granted with limited access. One example of limited access which may be granted is that the requesting entity may be given read access to a portion, but not all, of the untrusted data. For example, the requesting entity may be given read access to only the header of a file but not the complete file itself or may be given read access to a specified number of bytes or blocks of the file.

Another example of granting the request with limited access is allowing the requested action to be performed on the untrusted data, but the action is performed within a different virtual machine from which the request arose. The different virtual machine in which the action is performed may be a pre-existing virtual machine (i.e., a virtual machine that is already instantiated) or a virtual machine that will be instantiated for purposes of performing the action.

To illustrate a concrete example with reference to FIG. 2, assume that a request to perform open an untrusted text document was issued in LVM 240. This request may be redirected to cognitive assist module 236. The request may be denied to be performed within LVM 240 by cognitive assist module 236, but cognitive assist module 236 may seamlessly migrate the performance of the request to UCVM 266. Thus, the read operation on the untrusted text document will fail in LVM 240, but will be performed in UCVM 266 in a manner transparent to the user. UCVM 266 may be configured such that the request may be performed safely therein, e.g., UCVM 266 may have no access to a network or to file system 242. From the user's perspective, the user was able to do what the user wanted to do (i.e., read the text document), but from a system perspective, the untrusted text document was read in the proper virtual machine to protect the resources of the system.

Migrating the performance of an action directed against untrusted data to a virtual machine that is configured to contain any risk presented by the untrusted data advantageously allows the user to use the untrusted data without sacrificing the security of the computer system. For example, if an audio file, such as an ".MP3" file, is untrusted, then the user doesn't care which virtual machine plays the audio file, the user just simply wants to listen to the audio file. By migrating the playing of the untrusted audio file to a virtual machine having no exposure to system resources, the user may listen to the audio file without allowing any malicious code contained therein the opportunity to affect any lasting change in the system.

Certain types of request may be considered as involving untrusted data by virtue of the type of request. Thus, certain types of requests, such as a shell open command, may be considered as untrusted even if the request does not specify any data. The rationale behind such a policy is that certain types of requests can be used to cause mischief, and therefore, should be performed in a manner to prevent unnecessary exposure of system resources. To illustrate a concrete example with reference to FIG. 2, assume that a request to perform a shell open command was issued in VM0 230. This request may be redirected to cognitive assist module 236. The request may be denied, but seamlessly migrated to UCVM 264 for processing. UCVM 264 may be configured such that the request may be performed safely therein, e.g., UCVM 264 may have no access to a network or to file system 242. Thus, the shell open command will fail in VM0 230 but will be performed in UCVM 264 in a manner transparent to the user. From the user's perspective, the user was able to do what the user wanted to do, but from a system perspective, the shell open command was performed in the proper virtual machine to protect the resources of the system.

The policy itself used by cognitive assist module 236 in making this determination may be relatively straightforward or arbitrarily complex. For example, the policy may be based, at least in part, upon metadata contained within the untrustworthy records associated with the untrusted data and may consider any number of factors.

In an embodiment, the policy applied in step 520 may consider whether the entity requesting the performance of the action on the untrusted data intends to interpret the untrusted data. In general, a certain level of limited scope of interpretation may not pose an unacceptable level of risk. For example, it may be permissible to allow certain applications to read the header of untrusted file if the application is not going to read the untrusted file in its entirety. Processes that interpret a file in its entirety present more of a security concern, while processes that consider a file as opaque data present less of a concern. Thus, certain embodiments may, in performing step 520, prevent processes that interpret data from performing the requested action on untrusted data, but allow processes that do not interpret data to perform the requested action on untrusted data.

One approach for determining whether an application or process will be interpreting untrusted data is to examine the identity of the requesting application or process. Some applications or processes are known to treat files in an opaque manner, such as when a process that makes a backup of a file. Such applications or processes may be identified in a white list comprised within policy data 239.

Also, certain mime-types may be deemed to be safe, such as a calendar file. Such mime-types which pose little to no risk may also be identified on a white list.

Alternately, some applications or processes are known to interpret files, e.g., an application responsible for rendering a text document or digital image must interpret the file to render it properly. Applications or processes that are known to interpret data may be identified in a black list comprised within policy data 239. In this way, a white list or a black list may be consulted in step 520 in determining how to process the requested action. Thus, in a certain embodiments, a white list may be consulted in step 520 to allow certain programs/files to execute, while denying all others. Also, certain files or programs may be flagged so that any action performed by or on them are performed in a separate virtual machine, such as a UCVM or LVM, having characteristics designed to address the security concerns posed thereby.

Another approach for determining whether an application or process will be interpreting the untrusted data is to determine whether the requesting entity is a registered mime-type handler for the untrusted data. If an application or process is the registered mime-type handler for the mime-type of a file, then it is very likely that the application or process will interpret the file. Conversely, if an application or process is not the registered mime-type handler for the mime-type of a file, then it is very likely that the application or process will not interpret the file and treat the file as opaque data.

As an illustration of this principle, consider the application Outlook, a popular email application, available from Microsoft Corporation. Outlook is not the registered mime-type handler of the ".zip" mime-type. Therefore, if a user attempts to attach a compressed file having a mime-type of ".zip" to an email in Outlook, the Outlook application will not attempt to interpret the ".zip" file, but instead will treat the compressed ".zip" file as a stream of bytes and simply attach the compressed file to the email without interpreting the file. In this example, since Outlook will not be interpreting a compressed ".zip" file by attaching it to an email, if a user instructs Outlook to do so, then the policy applied in step 520 may permit such an action in recognition that the action poses an acceptable level of risk.

Certain mime-types are handled by the operating system itself, such as executable files. There is a concern in allowing such executable files to execute unchecked given their potential to affect change and potential carry malicious code. In an embodiment, if the user requests the execution of a file that is deemed untrustworthy, then the user may be notified that the action, and by extension the file, is untrustworthy. For example, a dialogue box may be displayed to the user indicated that the file the user just clicked on is an untrusted file. Alternatively, information about a file being untrusted may be displayed prior to the user clicking on the file to initiate execution of the file, such as by displaying such information to the user when the user does a move over operation over the icon for the file or right clicks on the icon for the file.

The user may be presented with an option to execute the file in an untrusted manner. If the user selects the option to execute the untrusted file, the untrusted file may be executed within a particular virtual machine, such as a UCVM, specifically tailored to prevent to contain the untrusted file. For example, the UCVM in which the untrusted file executed may not have any exposure to a network or a file system. For the same reason, the UCVM in which the untrusted file is executed may only exist during the execution of the file. When the file is done executing, the UCVM may be de-instantiated. As the UCVM exists only as long as necessary to run the program, no data need be persisted as a result of executing the file. On the other hand, if persisting changes made by an executable file is desirable by an IT administrator, this may be accomplished by determining the changes made to UCVM as a result of the execution of the program and subsequently storing those changes so the changes may be injected into another virtual machine at a later date.

In an embodiment, the policy applied in step 520 may consider how the requesting entity accessed the file. Files may be access from different API levels. Such differing API levels include, in decreasing proximity to the user, an Explorer Shell Interface API level, a Win32 API level, and a Kernel API level. In other words, a user is more likely to initiate an action that utilizes the Explorer Shell Interface API level. The Explorer Shell Interface API may in turn make calls into the Win32 API level, and so on. Thus, an action initiated by the user is more likely to access a file via the Explorer Shell Interface API than the Kernel API, whereas a malicious executable file is more likely to utilize the Win32 API to discover and interact with files rather than the Explorer Shell Interface API.

In an embodiment, an action initiated by a user is, when at all possible, attempted to be performed to provide the user with a user experience that behaves as expected and is close to native as possible. However, an action that is not initiated by a user is not afforded the same deference because such an action is more likely to be the result of malicious code that has been inadvertently introduced into the computer system.

To illustrate an example, imagine a malicious program that traverses all the files in a file system on the client, reads the files, and extracts text from them. To prevent this hypothetical malicious program and other such programs from succeeding, embodiments of the invention prevents such programs operating without benefit of either (a) being initiated by the user or (b) being identified on a white list from discovering the presence of files in the computer system. In this way, this hypothetical malicious program would be prevented from learning about any files stored on the disk.

Similarly, certain embodiments, in performing step 520, may deny the existence of a file to a program if the program is accessing the file through an API level that raises some concern. For example, at the file system level, embodiments may prevent certain kinds of access that are not the intended use case, such as an action against a file that does not originate from the Explorer Shell Interface API. Such an approach would prevent an indexing or backup program from stumbling across a file for mischievous purposes. As a result, in an embodiment, if the action requested to be performed in step 520 is not user initiated or is accessed from a API layer that is prohibited, then the action is deemed untrustworthy and the entity requesting the performance of the action on the file is informed the file does not exist (even if the file does exist).

Note that the policy consulted in step 520 may be, but need not be, the same policy which was consulted in step 510. In other words, an embodiment may store (a) a first set of policy data that describes one or more policies for identifying untrusted data or an untrusted action and (b) a second set of policy data that describes how to process an action involving untrusted data or an untrusted action.

In an embodiment, all files, or any portion thereof, in a file system that are deemed untrustworthy may be stored in an encrypted fashion. Thus, any program that attempts to open an untrusted file (for example, by scanning the file system) would be unable to read the untrusted file, thereby rendering the program safe from any malicious code contained within the untrusted file.

Embodiments of the invention may provide mechanisms to safely perform any operation against an untrusted file (such as opening or editing the file) by only permitting the operation to occur within a virtual machine, such as a UCVM. The encryption key(s) to encrypt and decrypt untrusted files may be managed using a variety of different approaches. To illustrate, such key(s) may be implemented as an enterprise wide PKI system for untrusted files (or classes of untrusted files) in an organization or such key(s) may be system local only. Any of the files deemed to be untrustworthy may be prevented from being decrypted unless the files are decrypted within a virtual machine instantiated for that purpose.

Certain embodiments may also make the un-encrypted data of a particular file type available to certain programs which are known to not interpret the contents of the particular file type. For example, embodiments may allow an email client, such as Microsoft Outlook, to read a raw untrusted file (decrypted) in response to a user directed "attach file" operation while composing an email. This operation may be permitted by an embodiment because Microsoft Outlook is not registered as a MIME handler for the file type in questions, and will never try to interpret the contents of the file being attached, but would simply blindly communicate the attached file further to the mail server.

Dynamic Adjustment of the File Format to Identify Untrusted Files

Embodiments may use other approaches other than those discussed above for identifying whether a file is trustworthy or not. For example, rather than maintaining a separate trustworthy record for each file, a driver may centrally manage and/or access metadata (termed "trust data" below) for use in determining the trustworthiness of a plurality of files within a file system. To illustrate how such an approach may operate, consider FIG. 6, which is a flowchart illustrating the steps of dynamically adjusting a file format to indicate the trustworthiness of a file according to an embodiment of the invention.

The steps of FIG. 6 shall be explained below with reference to FIG. 7, which is a block diagram of a system 700 according to an embodiment. System 700 includes an application 710, an operating system 720, a driver 730, a file system 740, and trust data 750. Application 710 refers to a software program that utilizes the resources of operating system 720. While only one application 710 is shown in FIG. 7 for clarity, system 700 may contain any number of applications. Driver 730 and trust data 750 shall each be explained in detail below with reference to the steps of FIG. 6. File system 740 refers to a file system maintained by operating system 720.

Figure 6:
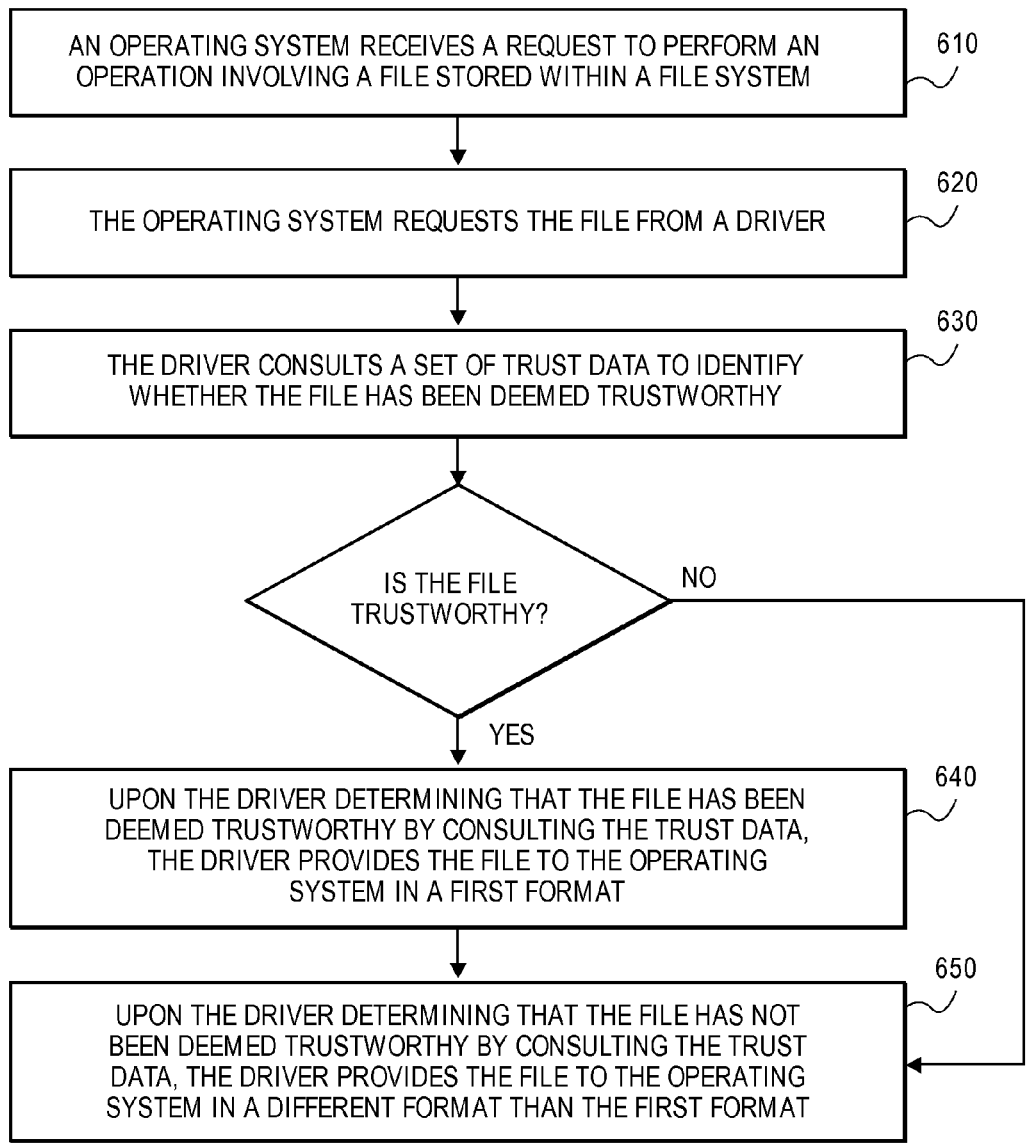
FIG. 6 is a flowchart illustrating the steps of dynamically adjusting a file format to indicate the trustworthiness of a file according to an embodiment of the invention.
Figure 7:
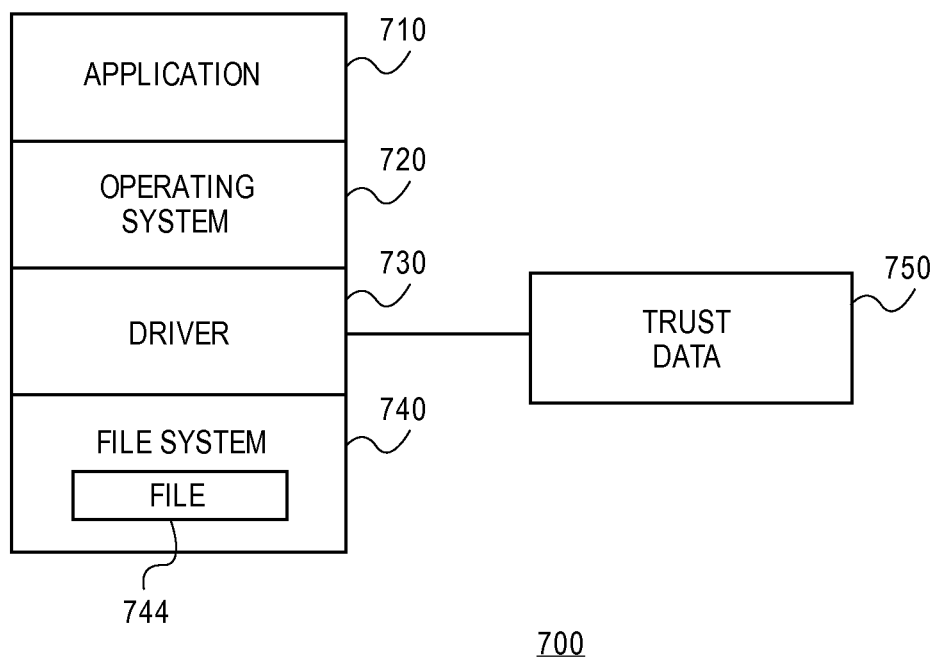
FIG. 7 is a block diagram of a system according to an embodiment of the invention.

In step 610 of FIG. 6, operating system 720 receives a request to perform an operation involving file 744. For example, operating system 720 may receive a request from application 710 to retrieve a copy of file 744. File 744 is stored within file system 740 which is maintained by operating system 720. For purposes of providing a concrete example, assuming that the name and path of file 744 is C:/temp/file.doc.

In step 620, after receiving the request of step 610, operating system 720 requests file 744 from driver 730. Note that this step is different than traditional approaches, as in the prior art, operating system 720 would direct a request for file 744 directly to file system 740.

The role performed by driver 730 in embodiments is to act as a middle man between operating system 720 and file system 740. Additionally, as shall be explained below, driver will format file 744 in a manner that indicates to consumer of file 744, such as operating system 720 and application 710, whether file 744 has been trustworthy or not.

In step 630, upon driver 730 receiving the request of step 620 from operating system 720, driver 730 consults trust data 750 to identify whether the file has been deemed trustworthy. Trust data 750 is data that indicates whether one or more files in file system 740 have been deemed trustworthy or not. As trust data 750 should not be updatable by untrusted parties, embodiments may prohibit trust data 750 from being updated by untrusted processes. Consequently, in an embodiment, any process executing in a UCVM or outside of the host operating system cannot update trust data 750.

Trust data 750 may be stored in a variety of different locations. Trust data 750 for a particular file may be stored within the same folder of file system 740 as the particular file. To illustrate an example, if the file name and path of file 744 is C:/temp/file.doc, then trust data 750 may be stored in C:/temp/~trustdata/<file id>, where ~trustdata is a folder that stores the file identifiers (or "file ids") of all files within the C:/temp folder that are deemed untrustworthy. Driver 730 consults trust data 750 to determine if the file id of file 744 is present within. If trust data 750 does contain the file id of file 744, then driver 730 may determine that file 744 is untrustworthy. While embodiments of the invention shall be chiefly described herein as using trust data 750 to identify files that have been deemed untrustworthy, naturally, other embodiments of the invention may employ trust data 750 that contains file ids of files that have been deemed trustworthy. Additionally, those in the art shall appreciate that trust data 750 may identify a file using other mechanisms than a file identifier (for example a hash of the file may be used), and so trust data 750 may employ a variety of different mechanisms for identifying files.

In another embodiment, trust data 750 for all files stored in file system 740 may be stored in a single location, such as a database, central repository, and the like. In such an embodiment, driver 730 may access a single set of trust data 750 for any file stored within file system 740.

Numerous policies were discussed above with reference to FIG. 5 for determining whether a file should be deemed trustworthy or not. The determination of whether a particular file should be deemed trustworthy may be based on these policies. Embodiments of the invention may employ a variety of different policies of varying complexity in determining whether a file should be deemed trustworthy.

In step 640, upon driver 730 determining that file 744 has been deemed trustworthy by consulting trust data 750, driver 730 provides file 744 to operating system 720 in a trusted format. The trusted format indicates to a consumer of file 744 that file 744 may be trusted.

The trusted format may correspond to a naming convention that is identical to how the file is natively stored in file system 740. In other words, the trusted format is an unaltered form of the name of file 744, including the file extension. To illustrate a concrete example, if the name of file 744 is file.doc, then the trusted format of an embodiment may be file.doc.

In step 650, upon driver 730 determining that file 744 has not been deemed trustworthy by consulting trust data 750, driver 730 provides file 744 to operating system 720 in an untrusted format that is different than the trusted format. The untrusted format indicates to a consumer of file 744 that file 744 has not been deemed trustworthy.

The untrusted format may correspond to a naming convention that is different than how the file is natively stored in file system 740. For example, the untrusted format may correspond to a different or additional file extension appended to the file. To illustrate a concrete example, if the name of file 744 is file.doc, then the untrusted format of an embodiment may be file.doc.untrusted. Thus, in an embodiment, when driver 730 provides any untrustworthy file to operating system 720, driver 730 may append the file extension ".untrusted" to the end of the file. Naturally, the addition of ".untrusted" to the name of file.doc in this example is merely illustrative of one embodiment, as any suffix or file extension to file 744 may be used.

The untrusted format is not limited to adding an additional file extension to a file, as other formats may be used to identify files that have not been deemed trustworthy. For example, the name of the file may be altered to identify the file is untrustworthy. For example, if the name of file 744 is file.doc, then the untrusted format of an embodiment may be "abcde_file.doc," where the presence of the label "abcde" in the name of the file signifies to a consumer of the file that the file is untrustworthy. Any alteration or addition to the name of a file (including its file extension) may be used as an untrusted format by an embodiment, so long as the format does not cause the file to be incorrectly interpreted.

Advantageously, consumers of file 744, for example application 710, receive file 744 in a format which is easy for the consumer to act upon the file in a manner based on the trustworthiness of file 744. By way of background, many applications, such as a web browser, are readily equipped to process a file differently based upon the file extension of the file. Thus, by configuring the file extension of a file to indicate the files' trustworthiness, applications and other consumers of the file inherently possess the necessary tools to discover whether the file is deemed trustworthy or not and act accordingly.

Beneficially, files are maintained within file system 740 in a single format, even though files may be provided to operating system 720 in different formats by driver 730 based upon the trustworthiness of those files. Storing files within a single format within file system 740 reduces the complexity of the file structure of file system 740 and allows for driver 730 to be integrated with a variety of different back end storage systems and/or file systems.

When a move operation, copy operation, or rename operation is performed upon file 744 in file system 740, trust data 750 identifies that same state of trustworthiness for file, and the copy of file 744 if a copy operation was performed on file 744, after the operation as identified for file 744 before the operation. In this way, operations performed upon files will maintain a consistent state of trustworthiness for the files.

In an embodiment, portions or sections of file system 740 may be identified as being untrustworthy or trustworthy. For example, a folder in file system 740 may be identified as being trusted or untrusted. Any files stored within these portions would inherent the properties of that portion. For example, if a file is stored within an untrusted file, then the file itself would be untrusted, even if the file was previously deemed trustworthy.

Hardware Mechanisms

Figure 8:
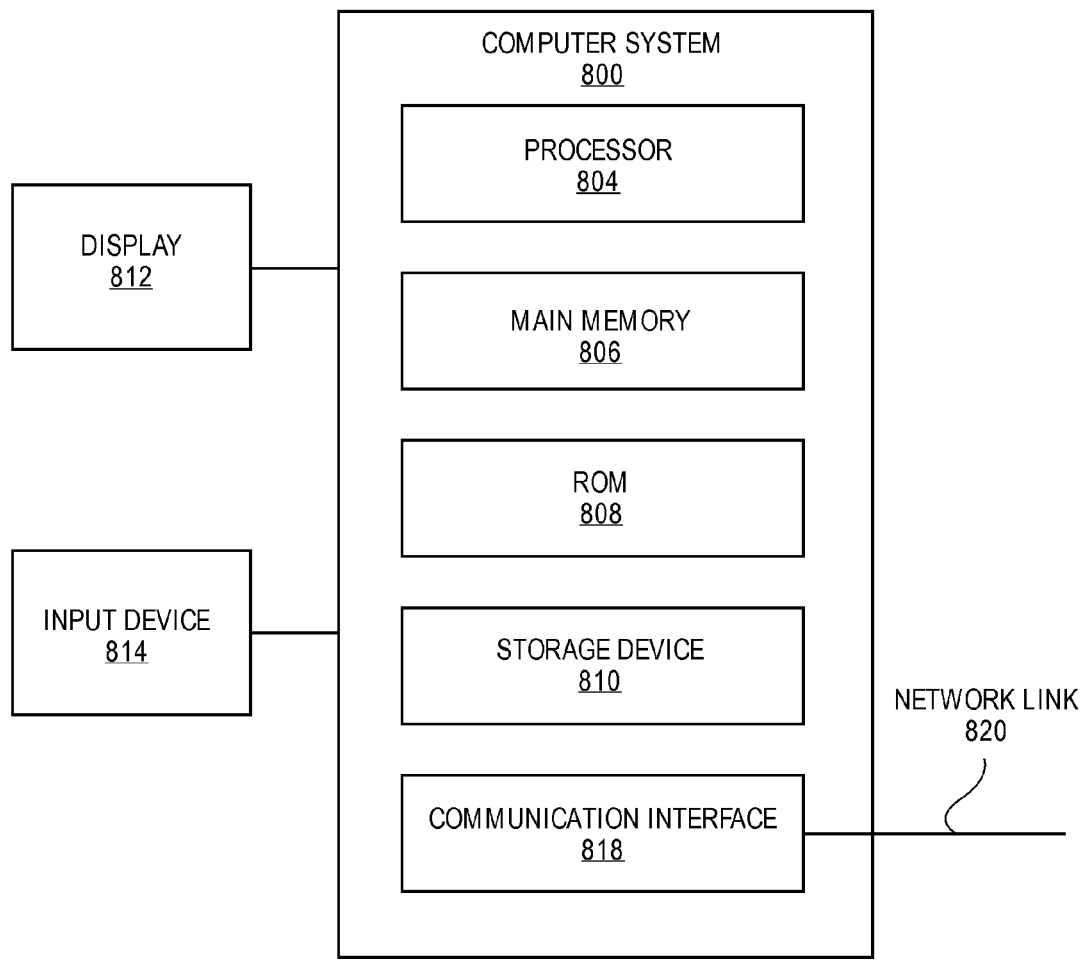
FIG. 8 is a block diagram that illustrates a computer system upon which an embodiment of the invention may be implemented.

FIG. 8 is a block diagram that illustrates a computer system 800 upon which an embodiment of the invention may be implemented. In an embodiment, computer system 800 includes processor 804, main memory 806, ROM 808, storage device 810, and communication interface 818. Computer system 800 includes at least one processor 804 for processing information. Computer system 800 also includes a main memory 806, such as a random access memory (RAM) or other dynamic storage device, for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device for storing static information and instructions for processor 804. A storage device 810, such as a magnetic disk or optical disk, is provided for storing information and instructions.

Computer system 800 may be coupled to a display 812, such as a cathode ray tube (CRT), a LCD monitor, and a television set, for displaying information to a user. An input device 814, including alphanumeric and other keys, is coupled to computer system 800 for communicating information and command selections to processor 804. Other non-limiting, illustrative examples of input device 814 include a mouse, a trackball, or cursor direction keys for communicating direction information and command selections to processor 804 and for controlling cursor movement on display 812. While only one input device 814 is depicted in FIG. 8, embodiments of the invention may include any number of input devices 814 coupled to computer system 800.

Embodiments of the invention are related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 804 for execution. Such a medium may take many forms, including but not limited to, non-volatile media and volatile media. Non-volatile media includes, for example, optical or magnetic disks, such as storage device 810. Volatile media includes dynamic memory, such as main memory 806.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 804 for execution. For example, the instructions may initially be carried on a magnetic disk of a remote computer. The remote computer can load the instructions into its dynamic memory and send the instructions over a network link 820 to computer system 800.

Communication interface 818 provides a two-way data communication coupling to a network link 820 that is connected to a local network. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through a local network to a host computer or to data equipment operated by an Internet Service Provider (ISP).

Computer system 800 can send messages and receive data, including program code, through the network(s), network link 820 and communication interface 818. For example, a server might transmit a requested code for an application program through the Internet, a local ISP, a local network, subsequently to communication interface 818. The received code may be executed by processor 804 as it is received, and/or stored in storage device 810, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium that stores one or more sequences of instructions, which when executed by one or more processors, causes:
    informing an operating system as to whether one or more files have been deemed trustworthy by performing:
        in response to an operating system receiving a request to perform an operation involving a file that is stored within a file system maintained by the operating system, the operating system requesting the file from a driver;
        upon the driver being requested by the operating system, the driver consulting a set of trust data to identify whether the file has been deemed trustworthy;
        upon the driver determining that the file has been deemed trustworthy by consulting the trust data, the driver providing the file to the operating system in a first format; and
        upon the driver determining that the file has not been deemed trustworthy by consulting the trust data, the driver providing the file to the operating system in a second format that is different than the first format,
        wherein the file is stored in a single format in the file system.

2. The non-transitory computer-readable storage medium of claim 1, wherein the single format is said first format.

3. The non-transitory computer-readable storage medium of claim 1, wherein the second format is a different name of the file than the first format.

4. The non-transitory computer-readable storage medium of claim 1, wherein the second format is a different or additional file extension for the file than present in the first format.

5. The non-transitory computer-readable storage medium of claim 1, wherein the trust data is stored within the same folder of the file system as the file.

6. The non-transitory computer-readable storage medium of claim 1, wherein all trust data associated with files stored in the file system is stored in a single location.

7. The non-transitory computer-readable storage medium of claim 1, wherein the operation is a move operation, a copy operation, or a rename operation, and wherein the trust data identifies the same state of trustworthiness for the file, and any copy thereof, after the performance of the operation as the trust data did before the performance of the operation.

8. The non-transitory computer-readable storage medium of claim 1, wherein the operating system is a host operating system that executes on a computer system, and wherein the trust data is updatable by the host operating system but not any virtual machines that are instantiated on the computer system.

9. An apparatus, comprising:
    one or more processors; and
    one or more non-transitory computer-readable storage mediums storing one or more sequences of instructions, which when executed, causes:
        informing an operating system as to whether one or more files have been deemed trustworthy by performing:
            in response to an operating system receiving a request to perform an operation involving a file that is stored within a file system maintained by the operating system, the operating system requesting the file from a driver;
            upon the driver being requested by the operating system, the driver consulting a set of trust data to identify whether the file has been deemed trustworthy;
            upon the driver determining that the file has been deemed trustworthy by consulting the trust data, the driver providing the file to the operating system in a first format; and
            upon the driver determining that the file has not been deemed trustworthy by consulting the trust data, the driver providing the file to the operating system in a second format that is different than the first format,
            wherein the file is stored in a single format in the file system.

10. The apparatus of claim 9, wherein the single format is said first format.

11. The apparatus of claim 9, wherein the second format is a different name of the file than the first format.

12. The apparatus of claim 9, wherein the second format is a different or additional file extension for the file than present in the first format.

13. The apparatus of claim 9, wherein the trust data is stored within the same folder of the file system as the file.

14. The apparatus of claim 9, wherein all trust data associated with files stored in the file system is stored in a single location.

15. The apparatus of claim 9, wherein the operation is a move operation, a copy operation, or a rename operation, and wherein the trust data identifies the same state of trustworthiness for the file, and any copy thereof, after the performance of the operation as the trust data did before the performance of the operation.

16. The apparatus of claim 9, wherein the operating system is a host operating system that executes on a computer system, and wherein the trust data is updatable by the host operating system but not any virtual machines that are instantiated on the computer system.

17. A method, comprising:
    informing an operating system as to whether one or more files have been deemed trustworthy by performing:

in response to an operating system receiving a request to perform an operation involving a file that is stored within a file system maintained by the operating system, the operating system requesting the file from a driver;

upon the driver being requested by the operating system, the driver consulting a set of trust data to identify whether the file has been deemed trustworthy;

upon the driver determining that the file has been deemed trustworthy by consulting the trust data, the driver providing the file to the operating system in a first format; and upon the driver determining that the file has not been deemed trustworthy by consulting the trust data, the driver providing the file to the operating system in a second format that is different than the first format, wherein the file is stored in a single format in the file system.

18. The method of claim 17, wherein the single format is said first format.

19. The method of claim 17, wherein the second format is (a) a different name of the file than the first format or (b) a different or additional file extension for the file than present in the first format.

20. The method of claim 17, wherein the operating system is a host operating system that executes on a computer system, and wherein the trust data is updatable by the host operating system but not any virtual machines that are instantiated on the computer system.

* * * * *